US012101743B2

(12) United States Patent
Bai et al.

(10) Patent No.: US 12,101,743 B2
(45) Date of Patent: Sep. 24, 2024

(54) PHASE TRACKING REFERENCE SIGNAL CONFIGURATIONS FOR SIDELINK COMMUNICATIONS

(71) Applicant: QUALCOMM Incorporated, San Diego, CA (US)

(72) Inventors: Tianyang Bai, Somerville, NJ (US); Hua Wang, Basking Ridge, NJ (US); Jung Ho Ryu, Fort Lee, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 17/669,736

(22) Filed: Feb. 11, 2022

(65) Prior Publication Data

US 2023/0262658 A1     Aug. 17, 2023

(51) Int. Cl.
*H04W 72/02*      (2009.01)
*H04L 5/00*       (2006.01)
*H04W 72/0446*    (2023.01)
*H04W 72/0453*    (2023.01)

(52) U.S. Cl.
CPC .......... *H04W 72/02* (2013.01); *H04L 5/0051* (2013.01); *H04L 5/0053* (2013.01); *H04W 72/0446* (2013.01); *H04W 72/0453* (2013.01)

(58) Field of Classification Search
CPC ............. H04W 72/02; H04W 72/0453; H04W 72/0446; H04L 5/0053; H04L 5/0051
See application file for complete search history.

(56) References Cited

U.S. PATENT DOCUMENTS

2021/0099265 A1*   4/2021   Shin ................ H04W 72/0453

* cited by examiner

*Primary Examiner* — Elton Williams
(74) *Attorney, Agent, or Firm* — Holland & Hart LLP

(57) ABSTRACT

Methods, systems, and devices for wireless communication are described. A user equipment (UE) may receive signaling indicating a phase tracking reference signal (PTRS) configuration for sidelink communications. The indicated PTRS configuration may correspond to a sidelink resource pool associated with a plurality of UEs. The UE may transmit control signaling indicating to change the indicated PTRS configuration to a preferred PTRS configuration for the sidelink communications based on a condition. The UE may receive the sidelink communications based on the preferred PTRS configuration.

30 Claims, 14 Drawing Sheets

PHASE TRACKING REFERENCE SIGNAL CONFIGURATIONS FOR SIDELINK COMMUNICATIONS

FIELD OF TECHNOLOGY

The following relates to wireless communication, including phase tracking reference signal (PTRS) configurations for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Generally, the described techniques provide procedures for updating a PTRS configuration for sidelink communications. The techniques enable a UE to determine whether to update a PTRS configuration based on a condition and transmit a preferred PTRS configuration to change the PTRS configuration. In some cases, the condition may correspond to a PTRS density (e.g., time densities, frequency densities, or both), a likelihood for a decoding failure of the sidelink communications, or both. For example, the PTRS configuration may be defined per sidelink resource pool and configured for a worse property (e.g., phase noise property, capability, etc.) than a property of the UE. The UE may determine that an update is beneficial and may transmit, to a wireless communication device (e.g., a second UE or a network entity), control signaling indicating the preferred PTRS configuration. The wireless communication device may update the PTRS configuration based on the indicated preferred PTRS configuration, such that the UE (e.g., a receiving UE) and the wireless communication device may use the preferred PTRS configuration for further sidelink communications.

A method for wireless communication at a UE is described. The method may include receiving signaling indicating a PTRS configuration for sidelink communications, where the indicated PTRS configuration corresponds to a sidelink resource pool associated with a set of multiple UEs, transmitting control signaling indicating to change the indicated PTRS configuration to a preferred PTRS configuration for the sidelink communications based on a condition, and receiving the sidelink communications based on the preferred PTRS configuration.

An apparatus for wireless communication at a UE is described. The apparatus may include a processor, a memory coupled with the processor, with instructions stored in the memory, the instructions being executable by the processor to cause the apparatus to receive signaling indicating a PTRS configuration for sidelink communications, where the indicated PTRS configuration corresponds to a sidelink resource pool associated with a set of multiple UEs, transmit control signaling indicating to change the indicated PTRS configuration to a preferred PTRS configuration for the sidelink communications based on a condition, and receive the sidelink communications based on the preferred PTRS configuration.

Another apparatus for wireless communication at a UE is described. The apparatus may include means for receiving signaling indicating a PTRS configuration for sidelink communications, where the indicated PTRS configuration corresponds to a sidelink resource pool associated with a set of multiple UEs, means for transmitting control signaling indicating to change the indicated PTRS configuration to a preferred PTRS configuration for the sidelink communications based on a condition, and means for receiving the sidelink communications based on the preferred PTRS configuration.

A non-transitory computer-readable medium storing code for wireless communication at a UE is described. The code may include instructions executable by a processor to receive signaling indicating a PTRS configuration for sidelink communications, where the indicated PTRS configuration corresponds to a sidelink resource pool associated with a set of multiple UEs, transmit control signaling indicating to change the indicated PTRS configuration to a preferred PTRS configuration for the sidelink communications based on a condition, and receive the sidelink communications based on the preferred PTRS configuration.

In some examples of the method, apparatuses, and non-transitory computer-readable medium described herein, the preferred PTRS configuration corresponds to a sidelink link between the UE and at least one UE of the set of multiple UEs.

In some examples of the method, apparatuses, and non-transitory computer-readable medium described herein, the sidelink link includes a bi-directional link and the preferred PTRS configuration corresponds to at least one directional sidelink link of the bi-directional link.

In some examples of the method, apparatuses, and non-transitory computer-readable medium described herein, transmitting the control signaling may include operations, features, means, or instructions for transmitting a request message to change the indicated PTRS configuration to the preferred PTRS configuration for the sidelink communications.

Some examples of the method, apparatuses, and non-transitory computer-readable medium described herein may further include operations, features, means, or instructions for determining a difference between the indicated PTRS configuration and the preferred PTRS configuration, where the difference corresponds to modulation and coding schemes, resource blocks, or both, associated with the indicated PTRS configuration and the preferred PTRS configuration, and where the control signaling includes an indication identifying the difference between the indicated PTRS configuration and the preferred PTRS configuration.

Some examples of the method, apparatuses, and non-transitory computer-readable medium described herein may further include operations, features, means, or instructions for receiving a feedback message associated with the preferred PTRS configuration, the feedback message including an acknowledgment (ACK) or a negative acknowledgment (NACK) and where receiving the sidelink communications may be based on the received feedback message associated with the preferred PTRS configuration.

Some examples of the method, apparatuses, and non-transitory computer-readable medium described herein may further include operations, features, means, or instructions for receiving the sidelink communications, based on the indicated PTRS configuration, before a threshold time after receiving the ACK and receiving the sidelink communications, based on the preferred PTRS configuration, at the threshold time, after the threshold time, or both, after receiving the ACK.

Some examples of the method, apparatuses, and non-transitory computer-readable medium described herein may further include operations, features, means, or instructions for refraining from transmitting the control signaling indicating to change the indicated PTRS configuration to the preferred PTRS configuration for the sidelink communications based on the condition.

Some examples of the method, apparatuses, and non-transitory computer-readable medium described herein may further include operations, features, means, or instructions for updating the preferred PTRS configuration based on the condition and transmitting second control signaling indicating the updated preferred PTRS configuration.

In some examples of the method, apparatuses, and non-transitory computer-readable medium described herein, the condition corresponds to a PTRS density in a time domain, a frequency domain, or both.

In some examples of the method, apparatuses, and non-transitory computer-readable medium described herein, the condition corresponds to a likelihood for a decoding failure of the sidelink communications.

A method for wireless communication at a UE is described. The method may include receiving signaling indicating a PTRS configuration for sidelink communications, where the indicated PTRS configuration corresponds to a sidelink resource pool associated with a set of multiple UEs, receiving control signaling indicating to change the indicated PTRS configuration to a preferred PTRS configuration for the sidelink communications, and transmitting the sidelink communications based on the preferred PTRS configuration.

An apparatus for wireless communication at a UE is described. The apparatus may include a processor, a memory coupled with the processor, with instructions stored in the memory, the instructions being executable by the processor to cause the apparatus to receive signaling indicating a PTRS configuration for sidelink communications, where the indicated PTRS configuration corresponds to a sidelink resource pool associated with a set of multiple UEs, receive control signaling indicating to change the indicated PTRS configuration to a preferred PTRS configuration for the sidelink communications, and transmit the sidelink communications based on the preferred PTRS configuration.

Another apparatus for wireless communication at a UE is described. The apparatus may include means for receiving signaling indicating a PTRS configuration for sidelink communications, where the indicated PTRS configuration corresponds to a sidelink resource pool associated with a set of multiple UEs, means for receiving control signaling indicating to change the indicated PTRS configuration to a preferred PTRS configuration for the sidelink communications, and means for transmitting the sidelink communications based on the preferred PTRS configuration.

A non-transitory computer-readable medium storing code for wireless communication at a UE is described. The code may include instructions executable by a processor to receive signaling indicating a PTRS configuration for sidelink communications, where the indicated PTRS configuration corresponds to a sidelink resource pool associated with a set of multiple UEs, receive control signaling indicating to change the indicated PTRS configuration to a preferred PTRS configuration for the sidelink communications, and transmit the sidelink communications based on the preferred PTRS configuration.

In some examples of the method, apparatuses, and non-transitory computer-readable medium described herein, the preferred PTRS configuration corresponds to a sidelink link between the UE and at least one UE of the set of multiple UEs.

In some examples of the method, apparatuses, and non-transitory computer-readable medium described herein, the sidelink link includes a bi-directional link and the preferred PTRS configuration corresponds to at least one directional sidelink link of the bi-directional link.

In some examples of the method, apparatuses, and non-transitory computer-readable medium described herein, receiving the control signaling may include operations, features, means, or instructions for receiving a request message to change the indicated PTRS configuration to the preferred PTRS configuration for the sidelink communications.

Some examples of the method, apparatuses, and non-transitory computer-readable medium described herein may further include operations, features, means, or instructions for determining a difference between the indicated PTRS configuration and the preferred PTRS configuration, where the difference corresponds to modulation and coding schemes, resource blocks, or both, associated with the indicated PTRS configuration and the preferred PTRS configuration, and where the control signaling includes an indication identifying the difference between the indicated PTRS configuration and the preferred PTRS configuration.

Some examples of the method, apparatuses, and non-transitory computer-readable medium described herein may further include operations, features, means, or instructions for transmitting a feedback message associated with the preferred PTRS configuration, the feedback message including an ACK or a NACK and where transmitting the sidelink communications may be based on the transmitted feedback message associated with the preferred PTRS configuration.

Some examples of the method, apparatuses, and non-transitory computer-readable medium described herein may further include operations, features, means, or instructions for transmitting the sidelink communications, based on the indicated PTRS configuration, before a threshold time after transmitting the ACK and transmitting the sidelink communications, based on the preferred PTRS configuration, at the threshold time, after the threshold time, or both, after transmitting the ACK.

Some examples of the method, apparatuses, and non-transitory computer-readable medium described herein may further include operations, features, means, or instructions for receiving second control signaling indicating an updated preferred PTRS configuration.

A method for wireless communication at a network entity is described. The method may include outputting a signaling indicating a PTRS configuration for sidelink communications, where the indicated PTRS configuration corresponds to a sidelink resource pool associated with a set of multiple UE, obtaining control signaling indicating to change the indicated PTRS configuration to a preferred PTRS configuration for the sidelink communications, and updating the indicated PTRS configuration based on the obtained control signaling indicating to change the indicated PTRS configuration to the preferred PTRS configuration.

An apparatus for wireless communication at a network entity is described. The apparatus may include a processor, memory coupled with the processor, and instructions stored in the memory. The instructions may be executable by the processor to cause the apparatus to output a signaling indicating a PTRS configuration for sidelink communications, where the indicated PTRS configuration corresponds to a sidelink resource pool associated with a set of multiple UE, obtain control signaling indicating to change the indicated PTRS configuration to a preferred PTRS configuration for the sidelink communications, and update the indicated PTRS configuration based on the obtained control signaling indicating to change the indicated PTRS configuration to the preferred PTRS configuration.

Another apparatus for wireless communication at a network entity is described. The apparatus may include means for outputting a signaling indicating a PTRS configuration for sidelink communications, where the indicated PTRS configuration corresponds to a sidelink resource pool associated with a set of multiple UE, means for obtaining control signaling indicating to change the indicated PTRS configuration to a preferred PTRS configuration for the sidelink communications, and means for updating the indicated PTRS configuration based on the obtained control signaling indicating to change the indicated PTRS configuration to the preferred PTRS configuration.

A non-transitory computer-readable medium storing code for wireless communication at a network entity is described. The code may include instructions executable by a processor to output a signaling indicating a PTRS configuration for sidelink communications, where the indicated PTRS configuration corresponds to a sidelink resource pool associated with a set of multiple UE, obtain control signaling indicating to change the indicated PTRS configuration to a preferred PTRS configuration for the sidelink communications, and update the indicated PTRS configuration based on the obtained control signaling indicating to change the indicated PTRS configuration to the preferred PTRS configuration.

In some examples of the method, apparatuses, and non-transitory computer-readable medium described herein, updating the indicated PTRS configuration may include operations, features, means, or instructions for updating the indicated PTRS configuration corresponding to the sidelink resource pool, updating a PTRS configuration corresponding to a sidelink link, or updating both, based on the obtained control signaling.

In some examples of the method, apparatuses, and non-transitory computer-readable medium described herein, the preferred PTRS configuration corresponds to a sidelink link between a UE and at least one of the set of multiple UEs.

In some examples of the method, apparatuses, and non-transitory computer-readable medium described herein, obtaining the control signaling may include operations, features, means, or instructions for obtaining a request message to change the indicated PTRS configuration to the preferred PTRS configuration for the sidelink communications.

Some examples of the method, apparatuses, and non-transitory computer-readable medium described herein may further include operations, features, means, or instructions for determining a difference between the indicated PTRS configuration and the preferred PTRS configuration, where the difference corresponds to modulation and coding schemes, resource blocks, or both, associated with the indicated PTRS configuration and the preferred PTRS configuration, and where the control signaling includes an indication identifying the difference between the indicated PTRS configuration and the preferred PTRS configuration.

Some examples of the method, apparatuses, and non-transitory computer-readable medium described herein may further include operations, features, means, or instructions for outputting a feedback message associated with the preferred PTRS configuration, the feedback message including an ACK or a NACK.

Some examples of the method, apparatuses, and non-transitory computer-readable medium described herein may further include operations, features, means, or instructions for receiving second control signaling indicating an updated preferred PTRS configuration.

DETAILED DESCRIPTION

In some wireless communications systems, a network entity may output one or more reference signals to assist a UE in demodulating and decoding wireless communications. One such reference signal may be a PTRS that may be used at the UE to compensate for phase noise and other frequency impairment. Phase noise may increase as a function of oscillator carrier frequency, and PTRS may be utilized at higher carrier frequencies, such as millimeter wave (mmW) frequencies for example, to mitigate the phase noise and other frequency impairments. A PTRS configuration may be defined for sidelink communications per sidelink resource pool. For example, a sidelink resource pool may be associated with multiple UEs that may follow the PTRS configuration defined for the sidelink resource pool.

However, the multiple UEs may have varying levels of frequency impairment and UE capability such that the PTRS configuration is configured for the worst UE sharing the sidelink resource pool. This may introduce unnecessary overhead for UEs of higher capability or different frequency impairment that may lead to drawbacks (e.g., lack of flexibility for sidelink operations, inefficient use of resources, higher power consumption, etc.).

The techniques described herein provide procedures for updating a PTRS configuration for sidelink communications. The techniques enable a UE to determine whether to update a PTRS configuration based on a condition and transmit a preferred PTRS configuration to change the PTRS configuration. In some cases, the condition may correspond to a PTRS density (e.g., time densities, frequency densities, or both), a likelihood for a decoding failure of the sidelink communications, or both. For example, the PTRS configuration may be defined per sidelink resource pool and configured for a worse property (e.g., phase noise property, capability, etc.) than a property of the UE. The UE may determine that an update is beneficial and may transmit, to a wireless communication device (e.g., a second UE or a network entity), control signaling indicating the preferred PTRS configuration. The wireless communication device may update the PTRS configuration based on the indicated preferred PTRS configuration, such that the UE (e.g., a receiving UE) and the wireless communication device may use the preferred PTRS configuration for further sidelink communications.

Aspects of the disclosure are initially described in the context of wireless communications systems. Aspects of the disclosure are further illustrated by and described with reference to apparatus diagrams, system diagrams, and flowcharts that relate to PTRS configurations for sidelink communications.

Figure 1:
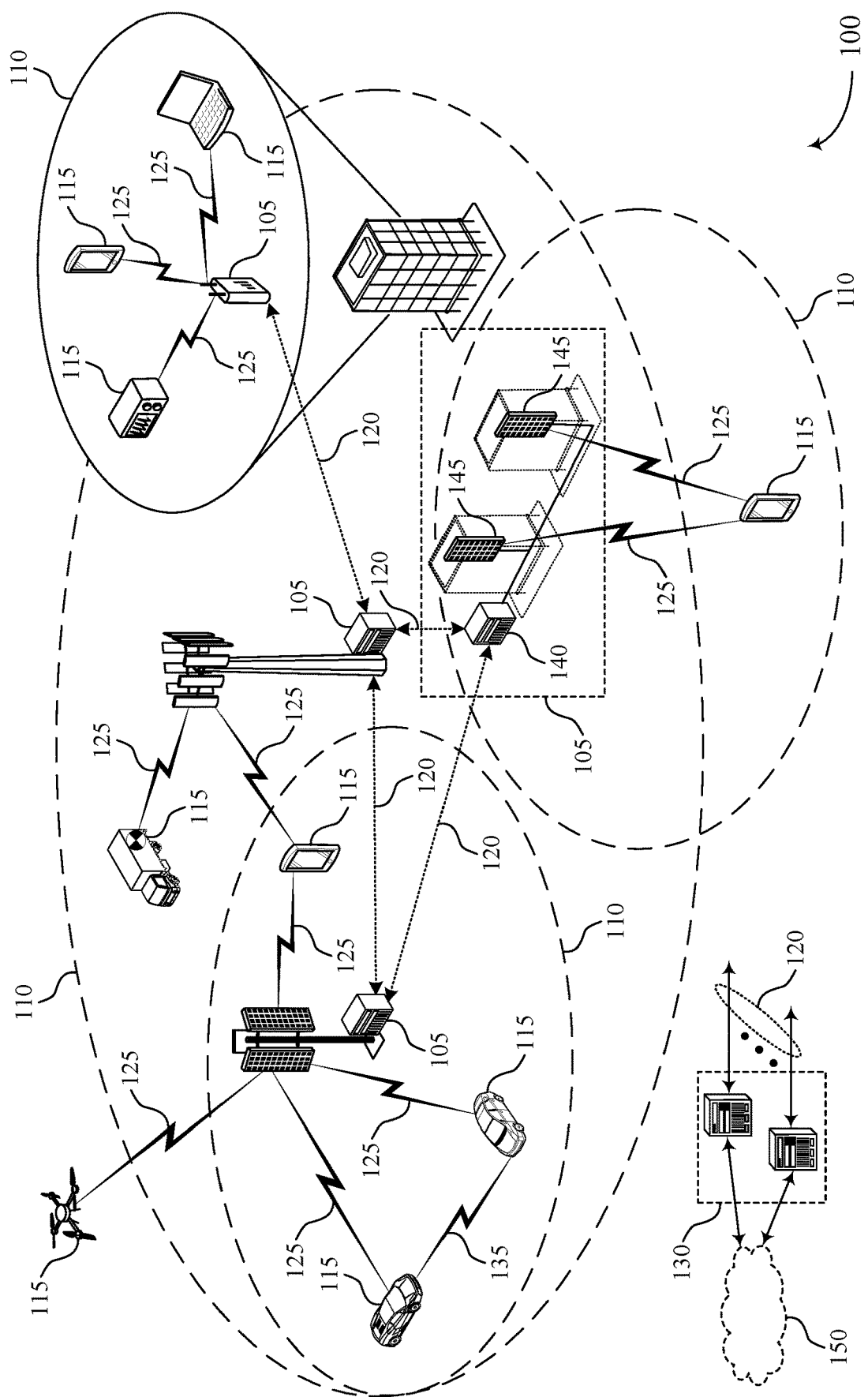
FIGS. 1 and 2 illustrate examples of wireless communications systems that support PTRS configurations for sidelink communications in accordance with one or more aspects of the present disclosure.

FIG. 1 illustrates an example of a wireless communications system 100 that supports PTRS configurations for sidelink communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a network entity, a network device, a network node, a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to any combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or any combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use any combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include any combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may use a PTRS to compensate for phase noise and other frequency impairments. For example, at higher carrier frequencies, such as mmW frequencies for example, phase noise and other frequency impairments (e.g., carrier frequency offset (CFO) and doppler shift) may increase. Such frequency impairment may affect decoding performance in data transmissions (e.g., data transmissions with a medium or high modulation coding scheme (MCS)). To help mitigate the frequency impairment, UEs 115 may utilize PTRS signals as pilots to keep track of phase drift over time, and perform compensation techniques accordingly.

To determine time and frequency densities for the PTRS (e.g., for SU-MIMO), the UE 115 may be configured (e.g., RRC configured) with one or more PTRS density tables associated with scheduled MCSs and bandwidths. For example, the UE 115 may be configured with a set of tables where a first table of the set may map MCS thresholds to PTRS time densities, and a second table of the set may map bandwidth allocation thresholds (e.g., a number of contiguous resource blocks or scheduled bandwidth) to PTRS frequency densities. In some examples (e.g., cyclic prefix-orthogonal division multiplexing (CP-OFDM)), the first table may include time densities for every fourth, second, and every symbol, depending on the MCS thresholds. In some cases, the UE 115 may expect, based on the second table, for the time densities to increase as the scheduled MCSs increases (time densities for some reserved MCSs may not increase with the MCSs). Additionally, the second table may include frequency densities occupying one subcarrier in every resource block, every second resource block, and every fourth resource block, depending on the contiguous scheduled bandwidth allocation values (e.g., a number of scheduled resource blocks). Depending on the time densities, the frequency densities may occupy a portion or all resource elements of the resource block. In some cases, the UE 115 may expect, based on the second table, for the frequency densities to decrease as the contiguous scheduled bandwidth allocation values increases. Accordingly, a UE 115 may determine time and frequency densities for PTRSs based on the set of tables and a particular MCS value and bandwidth allocation value.

In some cases, the UE 115 may determine the time and frequency densities based on a pre-configuration. For example, the UE 115 may be preconfigured with PTRS parameters (e.g., DL-PTRS-present and UL-PTRS-present). When the PTRS parameters are enabled, the UE 115 may determine a number of PTRS ports (e.g., one PTRS port) are present in every OFDM symbol and for every Nth resource block (e.g., every second resource block). In some cases, the configured PTRS tables (e.g., RRC configured tables) may take precedence over the preconfigured PTRS parameters.

PTRS signals may be optimized for different scenarios to help the UE 115 reach a higher performance. As such, different PTRS densities (e.g., time and frequency densities) are desired to compensate for phase noise and other frequency impairments. Because the PTRS density is a function of phase noise, the UE 115 may recommend a desired PTRS density based on a phase noise property of the UE 115. In some cases, the UE 115 may send recommendations for the desired PTRS density for each bandwidth, subcarrier spacing (SCS), and MCS, as a UE capability in an RRC message. For unicast scenarios, the PTRS tables for both UE dedicated physical data shared channel (PDSCH) and physical uplink shared channel (PUSCH) unicast scenarios may be RRC configured on a per UE basis based on a UE capability report.

Some techniques may support PTRS configuration for sidelink communications (e.g., mmW sidelink). The base station 105 may transmit control signaling (e.g., Uu RRC) indicating the sidelink PTRS configuration. In some cases, the sidelink PTRS configuration may be separately configured (e.g., have separate tables) from the unicast PTRS configuration and may follow a similar table definition as the unicast PTRS configuration (e.g., the configuration in the Uu link). The UE 115 may utilize the sidelink PTRS configuration to determine the PTRS densities (e.g., time densities and frequency densities) for a PTRS signal based on the scheduled MCSs and the contiguous scheduled bandwidth allocation values.

In some examples, the sidelink PTRS configuration may be defined per sidelink resource pool. In such examples, the sidelink resource pool may be associated with multiple UEs 115 that may follow the sidelink PTRS configuration defined for the sidelink resource pool. The multiple UEs 115 may have varying levels of frequency impairment and UE capability such that the sidelink PTRS configuration is configured for the worst UE 115 sharing the sidelink resource pool. For example, a phase noise density configured by the sidelink PTRS configuration (e.g., a minimum phase noise density used to decode the sidelink communication) may be based on a worst phase noise property of candidate sidelink pairs (e.g., a transmitter UE 115 and a receiver UE 115). Thus, regardless of individual frequency impairment (e.g., phase noise property) all of the multiple UEs 115 sharing the same sidelink resource pool will follow the same sidelink PTRS configuration, configured for the worst UE 115. This may introduce unnecessary PTRS overhead for the UEs 115 sharing the sidelink resource pool with better phase noise properties.

In some examples, the wireless communications system 100 may support techniques for updating a PTRS configuration for sidelink communications. The techniques enable a UE 115 to determine whether to update a sidelink PTRS configuration based on a condition and transmit a preferred sidelink PTRS configuration to change the sidelink PTRS configuration. In some cases, the condition may correspond to a PTRS density (e.g., time densities, frequency densities, or both), a likelihood for a decoding failure of the sidelink communications, or both. For example, the sidelink PTRS configuration may be defined per sidelink resource pool and configured for a worse property (e.g., phase noise property, capability, etc.) than a property of the UE 115. The UE 115 may determine that an update is beneficial (e.g., improve processing of sidelink communications, or the like) and may transmit, to a wireless communication device (e.g., a second UE 115 or a base station 105), control signaling indicating the preferred sidelink PTRS configuration. The wireless communication device may update the sidelink PTRS configuration, based on the indicated preferred sidelink PTRS configuration, on a per sidelink link basis. Thus, the wireless communications system 100 may allow feedback signaling from a receiver UE (e.g., the UE 115) to determine an appropriate PTRS configuration for the sidelink link.

In some cases, the per sidelink link PTRS configuration may be configured for some scenarios. For example, in some scenarios, when the sidelink communications may occur infrequently, or an adjustment of the PTRS configuration for per sidelink link configuration over the PTRS configuration for per sidelink resource pool configuration is minor, the additional signaling for updating the PTRS configuration may be greater than or minimally less than the PTRS overhead associated with the sidelink resource pool configuration. In such scenarios, the UE 115 may determine to refrain from updating the sidelink PTRS configuration. However, in some other scenarios, for example, the sidelink link may be maintained for a long time, data exchange may be frequent, the difference between the per sidelink link configuration and the per sidelink resource pool configuration overhead is significant, or any combination thereof, the UE 115 may determine to update the sidelink PTRS configuration on a per sidelink basis to reduce PTRS overhead. Additionally, in some sidelink links, the UE 115 may determine that the sidelink communications are difficult to decode using the per sidelink resource pool configuration due to phase noise impacts (e.g., the base station 105 chose a bad sidelink PTRS configuration). The UE 115 may transmit a feedback message indicating to update the PTRS configuration based on the difficulty to decode and the base station 105 may update the per sidelink resource pool configuration, utilize the per sidelink link configuration, or both.

Figure 2:
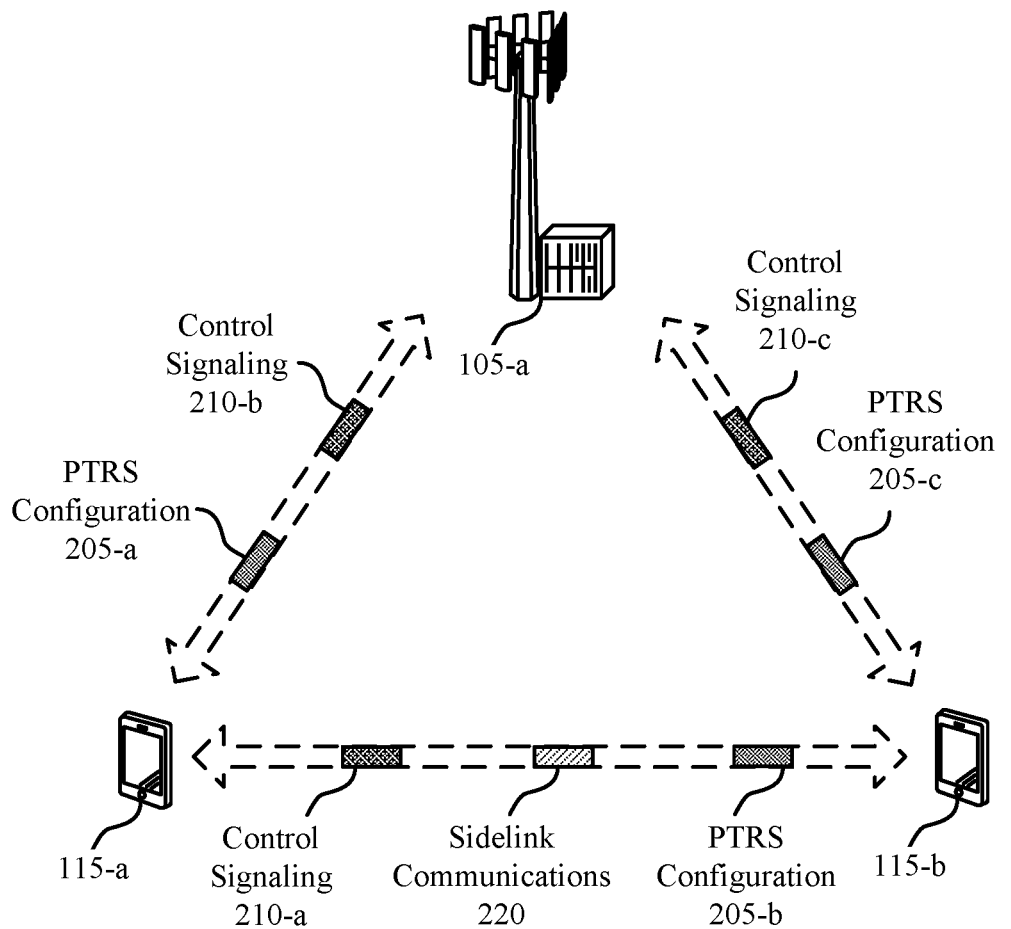

FIG. 2 illustrates an example of a wireless communications system 200 that supports PTRS configurations for sidelink communications in accordance with aspects of the present disclosure. In some examples, the wireless communications system 200 may implement aspects of the wireless communications system 100. For example, the wireless communications system 200 may include a base station 105-*a*, a UE 115-*a*, and a UE 115-*b*, which may be examples of a base station 105 and a UE 115 respectively, as described herein with reference to FIG. 1. In some cases, the UE 115-*a* and the UE 115-*b* may represent examples of a transmitter UE 115 in sidelink communication with a receiver UE 115 respectively. The transmitter UE 115 may be defined as transmitting control information and/or data (e.g., sidelink communications 220) associated with a PTRS signal and the receiver UE 115 may be defined as receiving the control information and/or data, and the PTRS signal. The UE 115-*a* and the UE 115-*b* may also represent multiple UEs 115 sharing a sidelink resource pool, as described herein with reference to FIG. 1. The base station 105-*a*, the UE 115-*a*, and the UE 115-*b*, or any combination thereof, may be in wireless communication.

In some examples, phase noise and other frequency impairments may affect a decoding performance of the UE 115-*b* for sidelink communications between the UE 115-*a* and the UE 115-*b*. To help mitigate the frequency impairments, the base station 105-*a* may output a PTRS configuration 205-*a*, corresponding to a sidelink resource pool associated with the multiple UEs 115. The UE 115-*a* may receive the PTRS configuration 205-*a*, and transmit, to the UE 115-*b*, a PTRS configuration 205-*b* based on the PTRS configuration 205-*a*. The UE 115-*b* may determine PTRS densities to use, based on the PTRS configuration 205-*b*, for a PTRS signal in order to track phase drift over time. However, the PTRS configuration 205-*a* and the PTRS configuration 205-*b* may be configured for a worst UE capability or frequency impairment of the multiple UEs 115. The UE 115-*b* may experience less frequency impairment or have a higher UE capability than the worst UE 115 of the multiple UEs 115, leading to unnecessary overhead for the UE 115-*b* and the UE 115-*a* during sidelink communications 220.

In order to mitigate the unnecessary overhead, aspects of the present disclosure enable the UE 115-*b* to determine whether to update (e.g., modify, adjust, switch) the PTRS configuration 205-*b* based on a condition (e.g., a PTRS density, a likelihood for a decoding failure, or both, among other examples). In some cases, the UE 115-*b* may refrain from updating the PTRS configuration 205-*b* and follow the PTRS configuration 205-*b* (e.g., PTRS configuration per the sidelink resource pool) for the sidelink communications 220.

In some other cases, the UE 115-*b* may determine to update the PTRS configuration 205-*b* based on the condition. For example, the UE 115-*b* may determine that a lower PTRS density (e.g., a time density, a frequency density, or both) may be used to decode the sidelink communications 220 with certain scheduled bandwidth and MCS values. Additionally, or alternatively, the UE 115-*b* may determine that the PTRS configuration 205-*b* causes a greater likelihood (probability) of a decoding failure (e.g., due to phase distortion). For both examples, among other examples, the UE 115-*b* may determine to update the PTRS configuration 205-*b*. In some examples, the UE 115-*b* may determine to update the PTRS configuration 205-*b* once per sidelink link or multiple times per sidelink link over time (e.g., due to a change in the condition).

In some cases, the UE 115-*b* may transmit a request to the UE 115-*a* to update (e.g., switch, modify, adjust) the PTRS configuration 205-*b* based on determining to update the PTRS configuration 205-*b*. The UE 115-*b* may transmit, to the UE 115-*a*, control signaling 210-*a* indicating a preferred PTRS configuration for the sidelink communications 220. The preferred PTRS configuration may correspond to a sidelink link between the UE 115-*a* and the UE 115-*b*. In some examples, the sidelink link may be a bi-directional link in which the preferred PTRS configuration corresponds to at least one directional sidelink link of the bi-directional link. For example, the bi-directional link may include a first directional sidelink link where the UE 115-*a* transmits sidelink data to the UE 115-*b*, a second directional sidelink link where the UE 115-*b* transmits the sidelink data to the UE 115-*a*, or both. For the first directional sidelink link, the UE 115-*b* may determine a first preferred PTRS configuration and for the second directional sidelink link, the UE 115-*a* may separately determine a second preferred PTRS configuration. That is, the determination of whether to update the PTRS configuration 205-b and the preferred PTRS configuration may be done per directional sidelink link.

In some examples, the indication of the control signaling 210-a may be a differential value between the PTRS configuration 205-b and the preferred PTRS configuration. For example, the differential value may correspond to a difference between the time densities (e.g., ptrs-$MCS_i$), the frequency densities (e.g., $N_{RBi}$), or both, of the PTRS configuration 205-b and the time densities, the frequency densities, or both, of the preferred PTRS configuration. In some cases (e.g., to reduce overhead), the control signaling 210-a may indicate a common difference value applied to all of the time densities, all of the frequency densities, or both, between the PTRS configuration 205-b and the preferred PTRS configuration.

Upon reception of the control signaling 210-a, the UE 115-a may transmit a feedback message (e.g., an ACK or a NACK) to the UE 115-b. The UE 115-a may transmit, to the base station 105-a, a control signaling 210-b indicating the preferred PTRS configuration for the sidelink communications 220. The control signaling 210-b may be similar to the control signaling 210-a. In some cases, the preferred PTRS configuration may be used for the sidelink link between the UE 115-a and the UE 115-b, the PTRS configuration 205-a and the PTRS configuration 205-b corresponding to the sidelink resource pool, or both. For example, the base station 105-a may update the PTRS configuration 205-a and the PTRS configuration 205-b corresponding to the per sidelink resource pool configuration based on the preferred PTRS configuration.

In some cases, the UE 115-a and the UE 115-b may transition to using the preferred PTRS configuration after a threshold time after transmitting or receiving the feedback message. For example, the UE 115-a may transmit the sidelink communications 220 after transmitting the feedback message and before the threshold time based on the PTRS configuration 205-b. Additionally, or alternatively, the UE 115-a may transmit the sidelink communications 220 after transmitting the feedback message and after the threshold time based on the preferred PTRS configuration indicated in the control signaling 210-a. In some examples, the UE 115-a, the UE 115-b, or both, may store the preferred PTRS configuration in per link PC5 RRC.

Additionally, or alternatively, the base station 105-a may communicate directly with the UE 115-b. For example, the base station 105-a may output a PTRS configuration 205-c corresponding to a sidelink resource pool. The UE 115-b may receive the PTRS configuration 205-c and determine to update the PTRS configuration 205-c. The UE 115-b may transmit, to the base station 105-a, control signaling 210-c indicating to change the PTRS configuration 205-c to a preferred PTRS configuration. In some cases, the preferred PTRS configuration may correspond to the sidelink link between the UE 115-a and the UE 115-b. The UE 115-b, the base station 105-a, and the UE 115-a may use the preferred PTRS configuration. In some cases, the base station 105-a may update the PTRS configuration 205-c corresponding to the per sidelink resource pool configuration (e.g., in RRC) based on the preferred PTRS configuration. The UE 115-a may transmit the sidelink communications 220 to the UE 115-b based on the preferred PTRS configuration.

Figure 3:
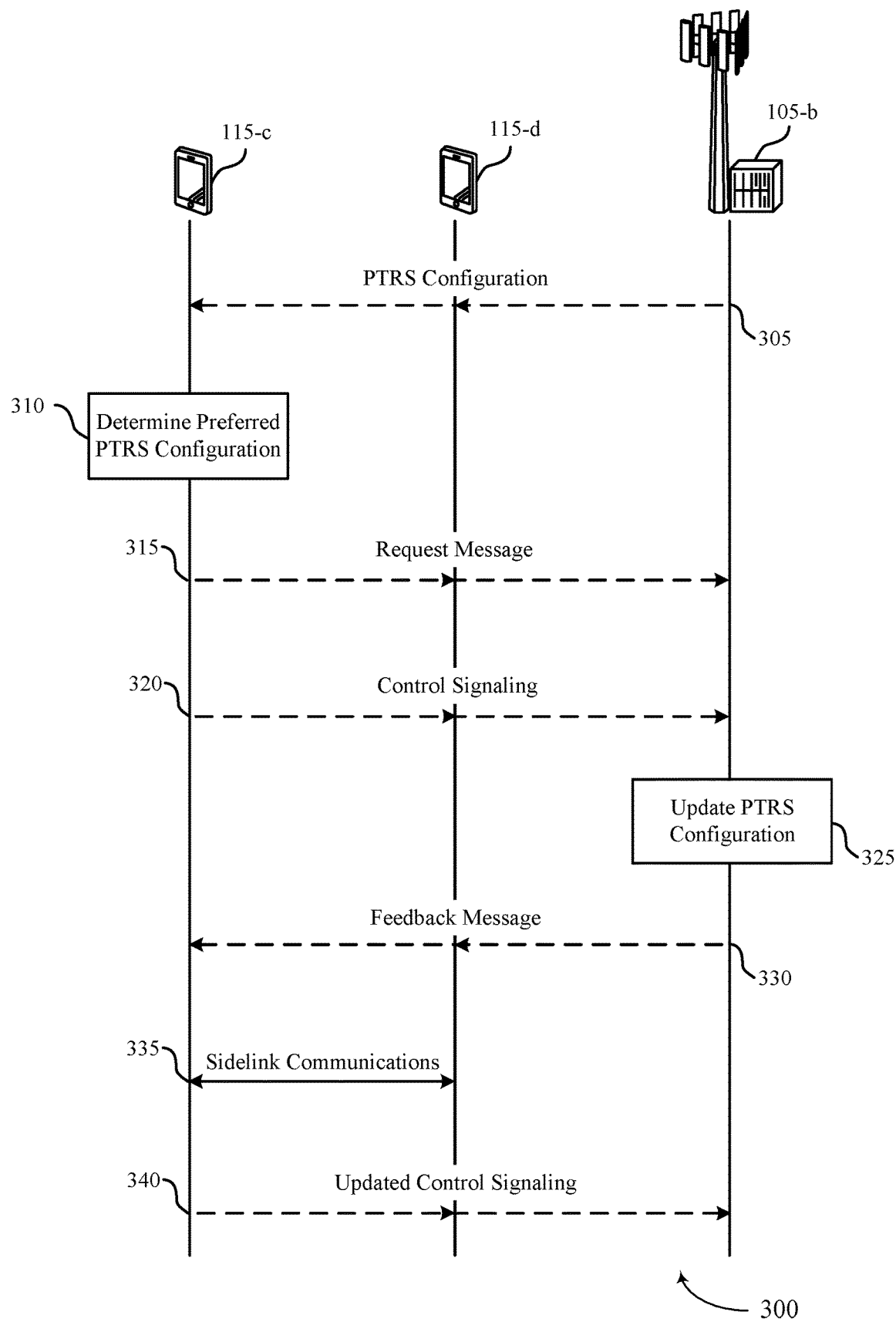
FIG. 3 illustrates an example of a process flow that supports PTRS configurations for sidelink communications in accordance with aspects of the present disclosure.

FIG. 3 illustrates an example of a process flow 300 that supports PTRS configurations for sidelink communications in accordance with aspects of the present disclosure. In some examples, the process flow 300 may implement or be implemented by aspects of the wireless communications systems 100 and 200 as described with reference to FIGS. 1 and 2, respectively. For example, the process flow 300 may be implemented by a base station 105-b, a UE 115-c, and a UE 115-d, which may be respective examples of base stations 105 and UEs 115 as described with reference to FIGS. 1 and 2, respectively. In the following description of the process flow 300, the operations between the base station 105-b, the UE 115-c, and the UE 115-d may be transmitted in a different order than the example order shown, or the operations performed by the base station 105-b, the UE 115-c, and the UE 115-d may be performed in different orders or at different times. Some operations may also be omitted from the process flow 300, and other operations may be added to the process flow 300.

At 305, the base station 105-b may optionally output, to multiple UEs 115 sharing a sidelink resource pool, a PTRS configuration corresponding to the sidelink resource pool associated with multiple UEs 115. The UE 115-d, the UE 115-c, or both, may be associated with the sidelink resource pool. The UE 115-d may transmit (e.g., relay, forward) the PTRS configuration to the UE 115-c. The PTRS configuration may be associated with sidelink communications between the UE 115-d and the UE 115-c.

At 310, the UE 115-c may determine whether to change (e.g., update, modify, adjust, switch) a PTRS configuration and determine a preferred PTRS configuration to change (e.g., update, modify, adjust, switch) to, based on a condition. In some examples, the condition may correspond to a PTRS density in a time domain, a frequency domain, or both. Additionally, or alternatively, the condition may correspond to a likelihood for a decoding failure of the sidelink communications. In some cases, the PTRS configuration may correspond to the sidelink resource pool associated with multiple UEs 115 and the UE 115-c may determine to change the PTRS configuration to a PTRS configuration corresponding to a sidelink link between the UE 115-c and the UE 115-d. In some cases, the PTRS configuration may correspond to the sidelink link and the UE 115-c may determine to update the PTRS configuration to a preferred PTRS configuration. The sidelink link may refer to a bi-directional sidelink link in which each directional link of the bi-direction sidelink link may be associated with a separate PTRS configuration and preferred PTRS configuration.

At 315, the UE 115-c may optionally transmit, to the UE 115-d, the base station 105-b, or both, a request message. The request message may include a request to change (e.g., update, modify, adjust, switch) the PTRS configuration to the preferred PTRS configuration of the UE 115-c. In some cases, the UE 115-d may transmit, to the base station 105-b, the request message.

At 320, the UE 115-c may optionally transmit, to the UE 115-d, the base station 105-b, or both, control signaling. The control signaling may indicate to change the PTRS configuration to the preferred PTRS configuration and indicate the preferred PTRS configuration. In some examples, the indication may be a differential value between the PTRS configuration and the preferred PTRS configuration. The differential value may correspond to MCSs, resource blocks, or both, associated with the PTRS configuration and the preferred PTRS configuration, as described herein with reference to FIG. 2. In some cases, the control signaling may include the request message. Optionally, the UE 115-d may transmit, to the base station 105-b, the control signaling.

At 325, the base station 105-b, the UE 115-d, the UE 115-c, or any combination thereof, may update the PTRS configuration. In some cases, the base station 105-b may update the PTRS configuration corresponding to the sidelink resource pool associated with the multiple UEs 115, the PTRS configuration corresponding to the sidelink link between the UE 115-*d* and the UE 115-*c*, or any combination thereof.

At 330, the base station 105-*b* may transmit, to the UE 115-*d*, the UE 115-*c*, or both, a feedback message. The feedback message may include an ACK or a NACK in response to the control signaling. In some cases, the base station 105-*b*, the UE 115-*d*, the UE 115-*c*, or any combination thereof, may update the PTRS configuration to the preferred PTRS configuration after a threshold time after transmitting or receiving the feedback message. Before the threshold time and after transmitting or receiving the feedback message, the UE 115-*d* and the UE 115-*c* may use the PTRS configuration. In some cases, the threshold time may be included in the control signaling, the feedback message, another message, preconfigured, or any combination thereof. Optionally, the UE 115-*d* may transmit, to the UE 115-*c*, the feedback message.

At 335, the UE 115-*c* and the UE 115-*d* may communicate the sidelink communications using the preferred PTRS configuration. At 340, the UE 115-*c* may optionally transmit, to the UE 115-*d*, the base station 105-*b*, or both, second control signaling indicating to update (e.g., further update) the preferred PTRS configuration and indicating a second preferred PTRS configuration. In some cases, the condition for updating the PTRS configuration may change over time. To compensate for these changes, the UE 115-*c* may follow the procedure described herein with reference to FIG. 3. Optionally, the UE 115-*d* may transmit, to the base station 105-*b*, the second control signaling.

Figure 4:
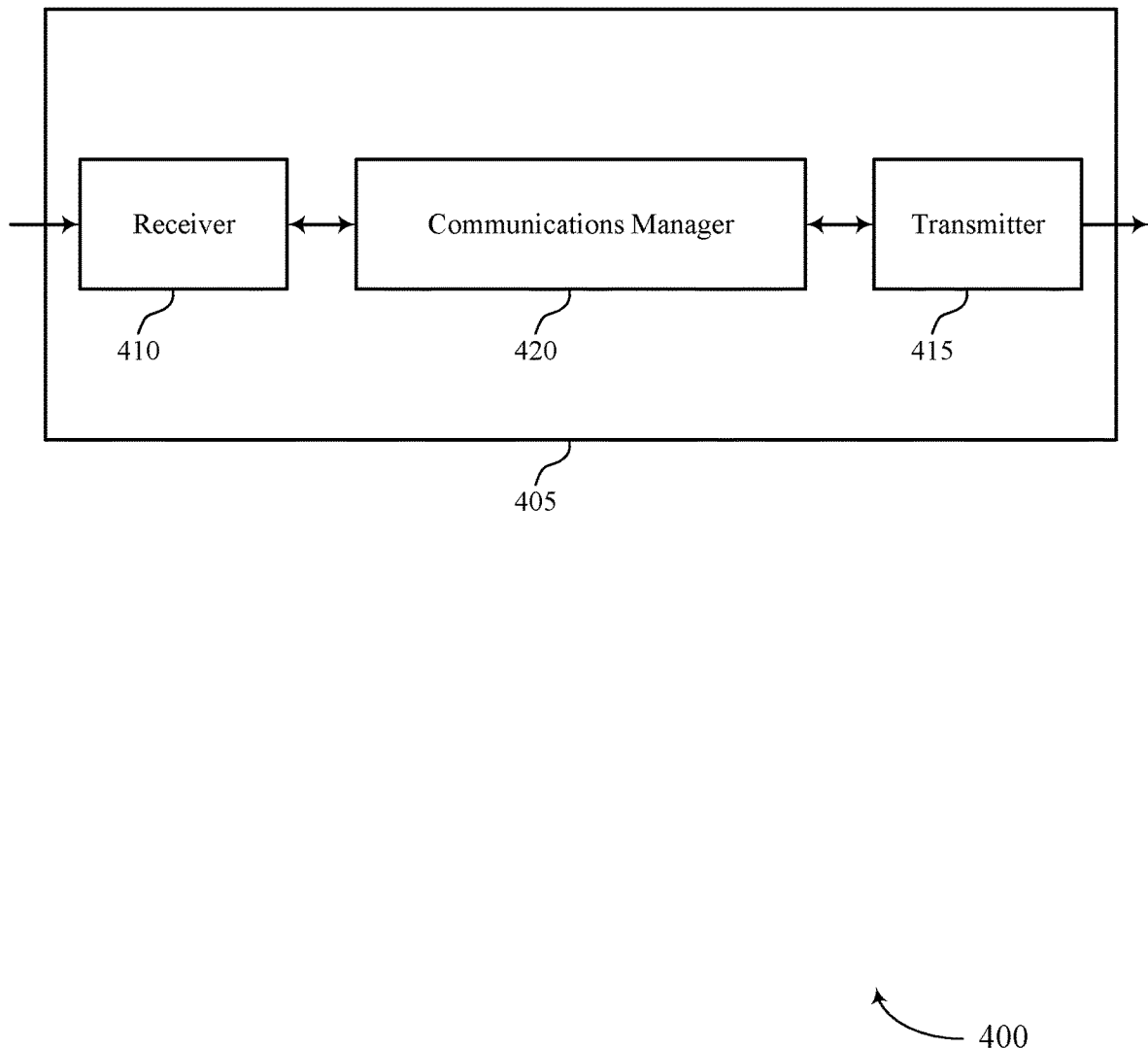
FIGS. 4 and 5 show block diagrams of devices that support PTRS configurations for sidelink communications in accordance with aspects of the present disclosure.

FIG. 4 shows a block diagram 400 of a device 405 that supports PTRS configurations for sidelink communications in accordance with aspects of the present disclosure. The device 405 may be an example of aspects of a UE 115 as described herein. The device 405 may include a receiver 410, a transmitter 415, and a communications manager 420. The device 405 may also include a processor (not shown). Each of these components may be in communication with one another (e.g., via one or more buses).

The receiver 410 may provide a means for receiving information such as packets, user data, control information, or any combination thereof associated with various information channels (e.g., control channels, data channels, information channels related to PTRS configurations for sidelink communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to PTRS configurations for sidelink communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of PTRS configurations for sidelink communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE (e.g., the device 405) in accordance with examples as disclosed herein. For example, the communications manager 420 may be configured as or otherwise support a means for receiving signaling indicating a PTRS configuration for sidelink communications, where the indicated PTRS configuration corresponds to a sidelink resource pool associated with a set of multiple UEs. The communications manager 420 may be configured as or otherwise support a means for transmitting control signaling indicating to change the indicated PTRS configuration to a preferred PTRS configuration for the sidelink communications based at least in part on a condition. The communications manager 420 may be configured as or otherwise support a means for receiving the sidelink communications based at least in part on the preferred PTRS configuration.

Additionally or alternatively, the communications manager 420 may support wireless communication at a UE (e.g., the device 405) in accordance with examples as disclosed herein. For example, the communications manager 420 may be configured as or otherwise support a means for receiving signaling indicating a PTRS configuration for sidelink communications, where the indicated PTRS configuration corresponds to a sidelink resource pool associated with a set of multiple UEs. The communications manager 420 may be configured as or otherwise support a means for receiving control signaling indicating to change the indicated PTRS configuration to a preferred PTRS configuration for the sidelink communications. The communications manager 420 may be configured as or otherwise support a means for transmitting the sidelink communications based at least in part on the preferred PTRS configuration.

By including or configuring the communications manager 420 in accordance with examples as described herein, the device 405 (e.g., a processor controlling or otherwise coupled to the receiver 410, the transmitter 415, the communications manager 420, or any combination thereof) may support techniques for reduced power consumption.

Figure 5:
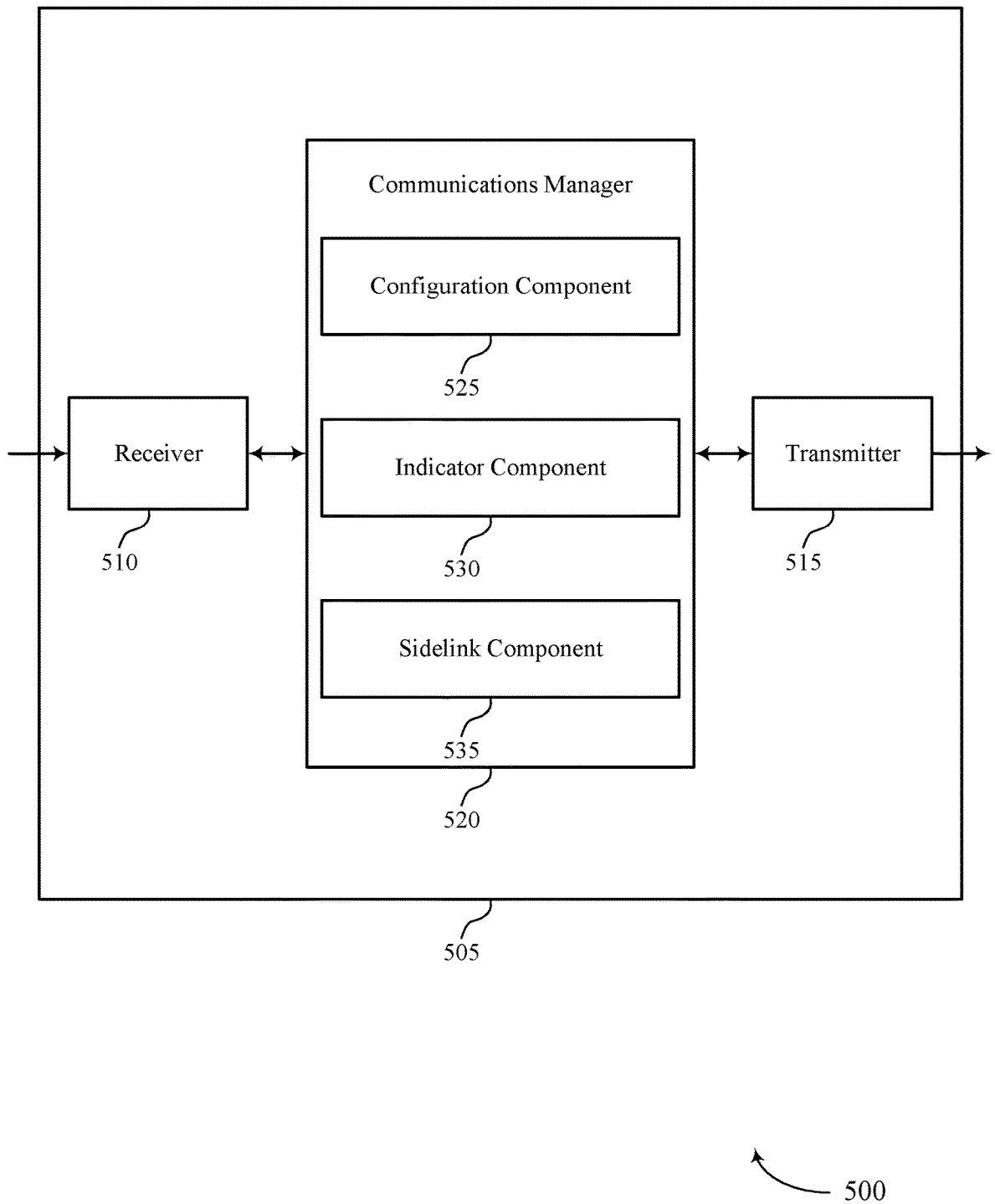

FIG. 5 shows a block diagram 500 of a device 505 that supports PTRS configurations for sidelink communications in accordance with aspects of the present disclosure. The device 505 may be an example of aspects of a device 405 or a UE 115 as described herein. The device 505 may include a receiver 510, a transmitter 515, and a communications manager 520. The device 505 may also include a processor (not shown). Each of these components may be in communication with one another (e.g., via one or more buses).

The receiver 510 may provide a means for receiving information such as packets, user data, control information, or any combination thereof associated with various information channels (e.g., control channels, data channels, information channels related to PTRS configurations for sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to PTRS configurations for sidelink communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of PTRS configurations for sidelink communications as described herein. For example, the communications manager 520 may include a configuration component 525, an indicator component 530, a sidelink component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE (e.g., the device 505) in accordance with examples as disclosed herein. The configuration component 525 may be configured as or otherwise support a means for receiving signaling indicating a PTRS configuration for sidelink communications, where the indicated PTRS configuration corresponds to a sidelink resource pool associated with a set of multiple UEs. The indicator component 530 may be configured as or otherwise support a means for transmitting control signaling indicating to change the indicated PTRS configuration to a preferred PTRS configuration for the sidelink communications based at least in part on a condition. The sidelink component 535 may be configured as or otherwise support a means for receiving the sidelink communications based at least in part on the preferred PTRS configuration.

Additionally or alternatively, the communications manager 520 may support wireless communication at a UE (e.g., the device 505) in accordance with examples as disclosed herein. The configuration component 525 may be configured as or otherwise support a means for receiving signaling indicating a PTRS configuration for sidelink communications, where the indicated PTRS configuration corresponds to a sidelink resource pool associated with a set of multiple UEs. The indicator component 530 may be configured as or otherwise support a means for receiving control signaling indicating to change the indicated PTRS configuration to a preferred PTRS configuration for the sidelink communications. The sidelink component 535 may be configured as or otherwise support a means for transmitting the sidelink communications based at least in part on the preferred PTRS configuration.

Figure 6:
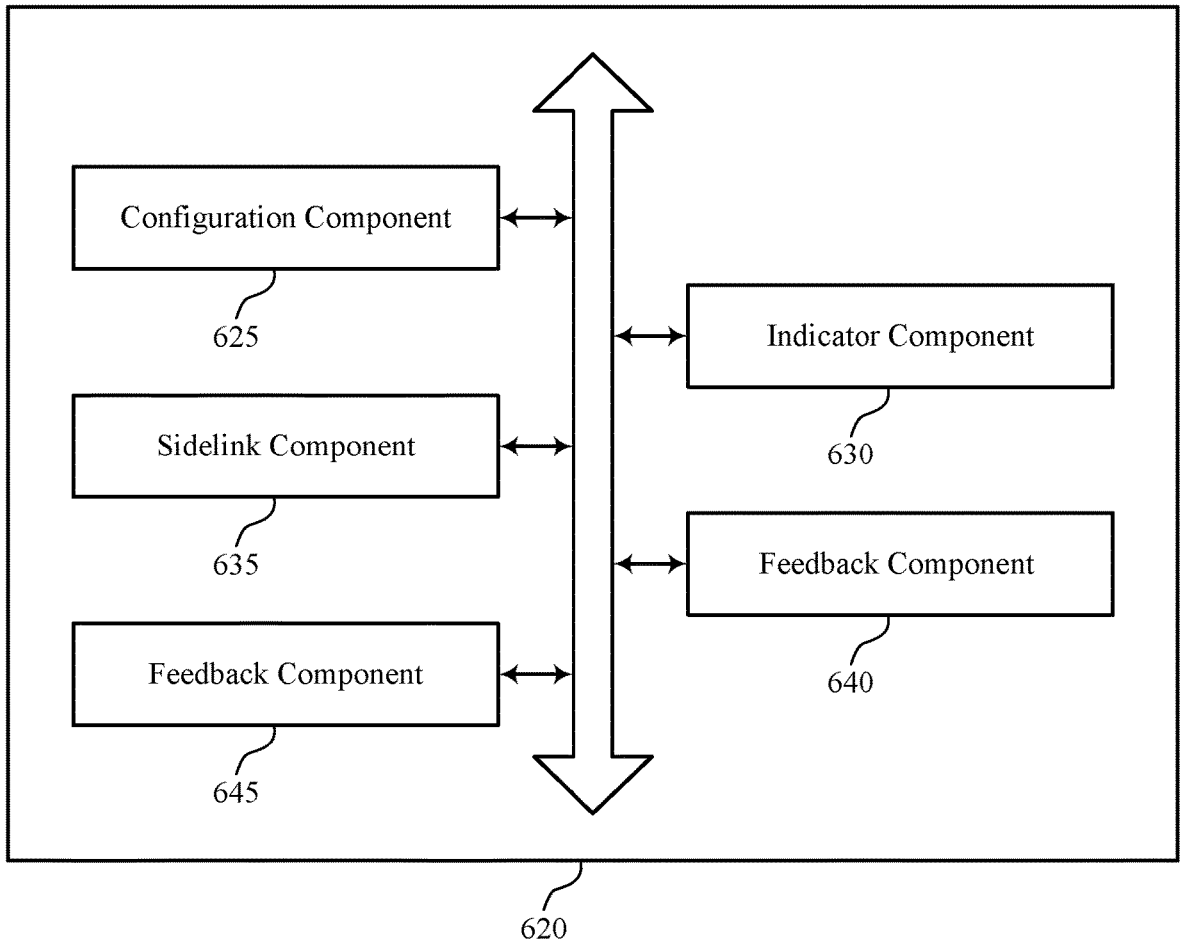
FIG. 6 shows a block diagram of a communications manager that supports PTRS configurations for sidelink communications in accordance with aspects of the present disclosure.

FIG. 6 shows a block diagram 600 of a communications manager 620 that supports PTRS configurations for sidelink communications in accordance with aspects of the present disclosure. The communications manager 620 may be an example of aspects of a communications manager 420, a communications manager 520, or both, as described herein. The communications manager 620, or various components thereof, may be an example of means for performing various aspects of PTRS configurations for sidelink communications as described herein. For example, the communications manager 620 may include a configuration component 625, an indicator component 630, a sidelink component 635, a feedback component 640, a feedback component 645, or any combination thereof. Each of these components may communicate, directly or indirectly, with one another (e.g., via one or more buses).

The communications manager 620 may support wireless communication at a UE in accordance with examples as disclosed herein. The configuration component 625 may be configured as or otherwise support a means for receiving signaling indicating a PTRS configuration for sidelink communications, where the indicated PTRS configuration corresponds to a sidelink resource pool associated with a set of multiple UEs. The indicator component 630 may be configured as or otherwise support a means for transmitting control signaling indicating to change the indicated PTRS configuration to a preferred PTRS configuration for the sidelink communications based at least in part on a condition. The sidelink component 635 may be configured as or otherwise support a means for receiving the sidelink communications based at least in part on the preferred PTRS configuration.

In some examples, the condition corresponds to a PTRS density in a time domain, a frequency domain, or both. In some examples, the condition corresponds to a likelihood for a decoding failure of the sidelink communications. In some examples, the preferred PTRS configuration corresponds to a sidelink link between the UE and at least one UE of the set of multiple UEs. In some examples, the sidelink link includes a bi-directional link. In some examples, the preferred PTRS configuration corresponds to at least one directional sidelink link of the bi-directional link. In some examples, to support transmitting the control signaling, the indicator component 630 may be configured as or otherwise support a means for transmitting a request message to change the indicated PTRS configuration to the preferred PTRS configuration for the sidelink communications.

In some examples, the configuration component 625 may be configured as or otherwise support a means for determining a difference between the indicated PTRS configuration and the preferred PTRS configuration. In some examples, the configuration component 625 may be configured as or otherwise support a means for where the difference corresponds to MCSs, resource blocks, or both, associated with the indicated PTRS configuration and the preferred PTRS configuration. In some examples, the control signaling includes an indication identifying the difference between the indicated PTRS configuration and the preferred PTRS configuration.

In some examples, the feedback component 640 may be configured as or otherwise support a means for receiving a feedback message associated with the preferred PTRS configuration, the feedback message including an ACK or a NACK. In some examples, the sidelink component 635 may be configured as or otherwise support a means for receiving the sidelink communications based at least in part on the received feedback message associated with the preferred PTRS configuration. In some examples, the sidelink component 635 may be configured as or otherwise support a means for receiving the sidelink communications, based at least in part on the indicated PTRS configuration, before a threshold time after receiving the ACK. In some examples, the sidelink component 635 may be configured as or otherwise support a means for receiving the sidelink communications, based at least in part on the preferred PTRS configuration, at the threshold time, after the threshold time, or both, after receiving the ACK.

In some examples, the indicator component 630 may be configured as or otherwise support a means for refraining from transmitting the control signaling indicating to change the indicated PTRS configuration to the preferred PTRS configuration for the sidelink communications based at least in part on the condition. In some examples, the configuration component 625 may be configured as or otherwise support a means for updating the preferred PTRS configuration based at least in part on the condition. In some examples, the indicator component 630 may be configured as or otherwise support a means for transmitting second control signaling indicating the updated preferred PTRS configuration.

Additionally or alternatively, the communications manager 620 may support wireless communication at a UE in accordance with examples as disclosed herein. In some examples, the configuration component 625 may be configured as or otherwise support a means for receiving signaling indicating a PTRS configuration for sidelink communications, where the indicated PTRS configuration corresponds to a sidelink resource pool associated with a set of multiple UEs. In some examples, the indicator component 630 may be configured as or otherwise support a means for receiving control signaling indicating to change the indicated PTRS configuration to a preferred PTRS configuration for the sidelink communications. In some examples, the sidelink component 635 may be configured as or otherwise support a means for transmitting the sidelink communications based at least in part on the preferred PTRS configuration.

In some examples, the preferred PTRS configuration corresponds to a sidelink link between the UE and at least one UE of the set of multiple UEs. In some examples, the sidelink link includes a bi-directional link. In some examples, the preferred PTRS configuration corresponds to at least one directional sidelink link of the bi-directional link. In some examples, to support receiving the control signaling, the feedback component 645 may be configured as or otherwise support a means for receiving a request message to change the indicated PTRS configuration to the preferred PTRS configuration for the sidelink communications.

In some examples, the configuration component 625 may be configured as or otherwise support a means for determining a difference between the indicated PTRS configuration and the preferred PTRS configuration. In some examples, the configuration component 625 may be configured as or otherwise support a means for where the difference corresponds to MCSs, resource blocks, or both, associated with the indicated PTRS configuration and the preferred PTRS configuration. In some examples, the control signaling includes an indication identifying the difference between the indicated PTRS configuration and the preferred PTRS configuration.

In some examples, the feedback component 645 may be configured as or otherwise support a means for transmitting a feedback message associated with the preferred PTRS configuration, the feedback message including an ACK or a NACK. In some examples, the sidelink component 635 may be configured as or otherwise support a means for where transmitting the sidelink communications is based at least in part on the transmitted feedback message associated with the preferred PTRS configuration. In some examples, the sidelink component 635 may be configured as or otherwise support a means for transmitting the sidelink communications, based at least in part on the indicated PTRS configuration, before a threshold time after transmitting the ACK. In some examples, the sidelink component 635 may be configured as or otherwise support a means for transmitting the sidelink communications, based at least in part on the preferred PTRS configuration, at the threshold time, after the threshold time, or both, after transmitting the ACK. In some examples, the configuration component 625 may be configured as or otherwise support a means for receiving second control signaling indicating an updated preferred PTRS configuration.

Figure 7:
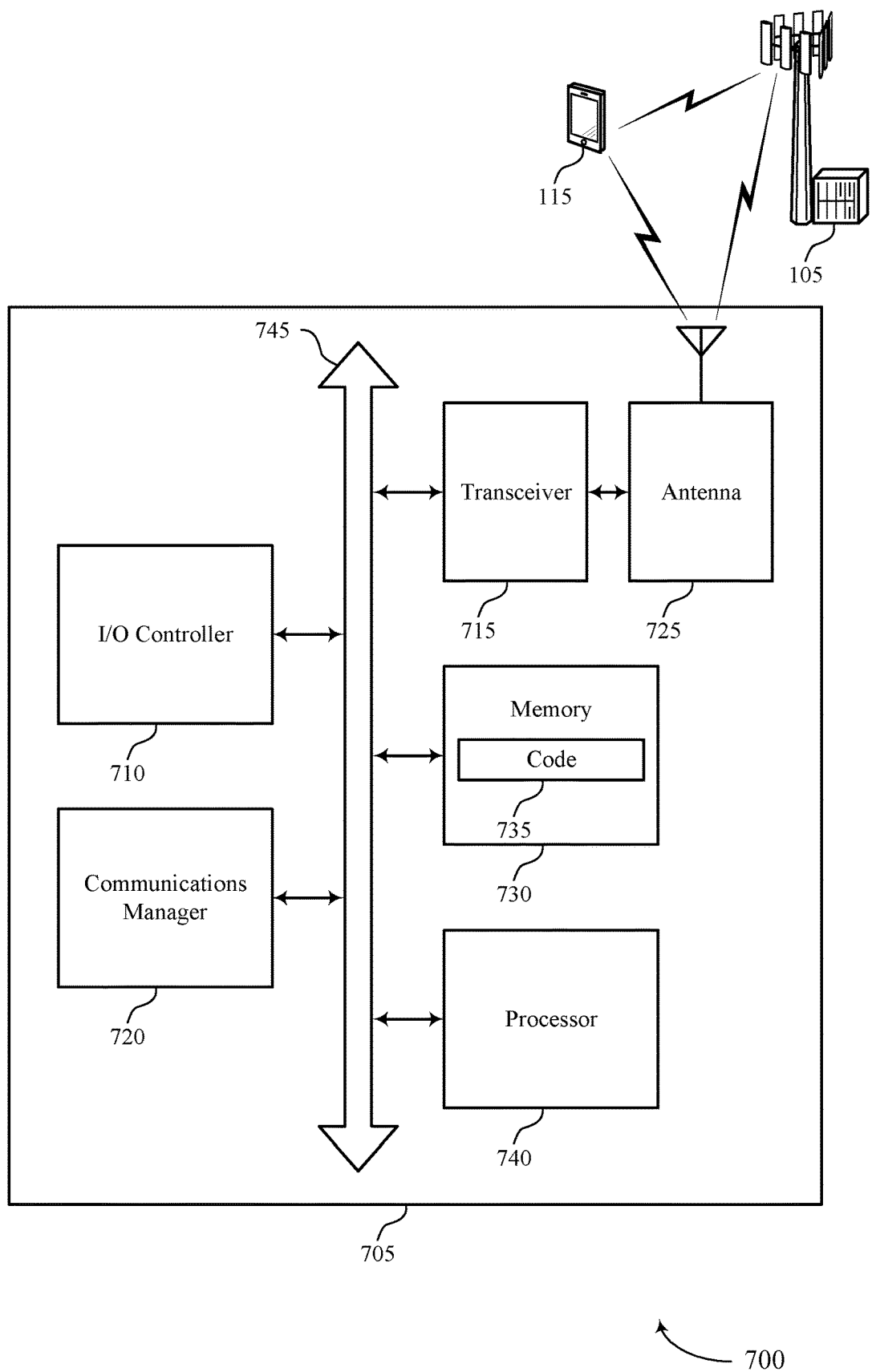
FIG. 7 shows a diagram of a system including a device that supports PTRS configurations for sidelink communications in accordance with aspects of the present disclosure.

FIG. 7 shows a diagram of a system 700 including a device 705 that supports PTRS configurations for sidelink communications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting PTRS configurations for sidelink communications). For example, the device 705 or a component of the device 705 may include a processor 740 and memory 730 coupled with or to the processor 740, the processor 740 and memory 730 configured to perform various functions described herein.

The communications manager 720 may support wireless communication at a UE (e.g., the device 705) in accordance with examples as disclosed herein. For example, the communications manager 720 may be configured as or otherwise support a means for receiving signaling indicating a PTRS configuration for sidelink communications, where the indicated PTRS configuration corresponds to a sidelink resource pool associated with a set of multiple UEs. The communications manager 720 may be configured as or otherwise support a means for transmitting control signaling indicating to change the indicated PTRS configuration to a preferred PTRS configuration for the sidelink communications based at least in part on a condition. The communications manager 720 may be configured as or otherwise support a means for receiving the sidelink communications based at least in part on the preferred PTRS configuration.

Additionally or alternatively, the communications manager 720 may support wireless communication at a UE (e.g., the device 705) in accordance with examples as disclosed herein. For example, the communications manager 720 may be configured as or otherwise support a means for receiving signaling indicating a PTRS configuration for sidelink communications, where the indicated PTRS configuration corresponds to a sidelink resource pool associated with a set of multiple UEs. The communications manager 720 may be configured as or otherwise support a means for receiving control signaling indicating to change the indicated PTRS configuration to a preferred PTRS configuration for the sidelink communications. The communications manager 720 may be configured as or otherwise support a means for transmitting the sidelink communications based at least in part on the preferred PTRS configuration.

By including or configuring the communications manager 720 in accordance with examples as described herein, the device 705 may support techniques for improved communication reliability and reduced communication latency. Additionally, by including or configuring the communications manager 720 in accordance with examples as described herein, the device 705 may support techniques for longer battery life.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of PTRS configurations for sidelink communications as described herein, or the processor 740 and the memory 730 may be otherwise configured to perform or support such operations.

Figure 8:
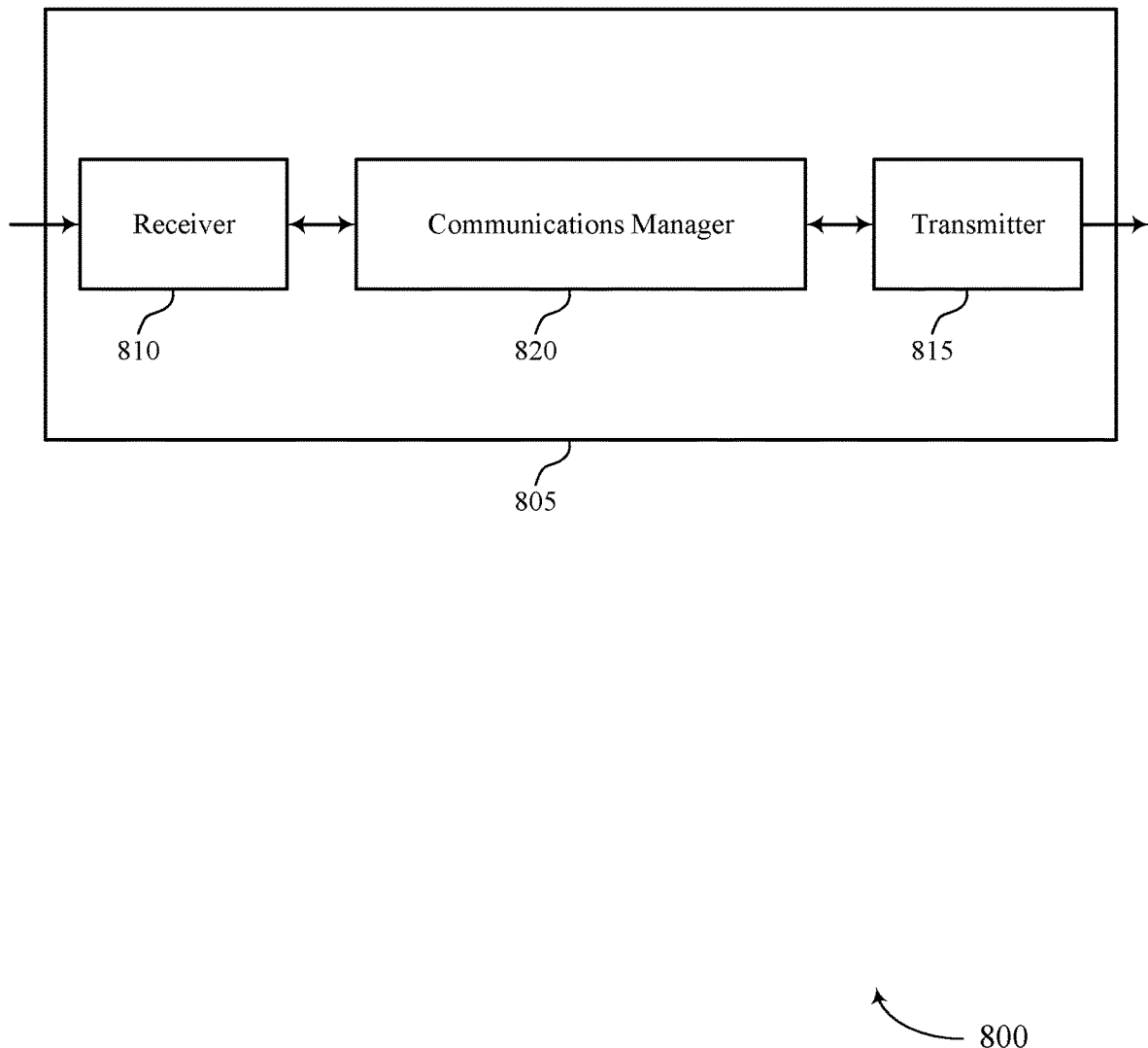
FIGS. 8 and 9 show block diagrams of devices that support PTRS configurations for sidelink communications in accordance with aspects of the present disclosure.

FIG. 8 shows a block diagram 800 of a device 805 that supports PTRS configurations for sidelink communications in accordance with aspects of the present disclosure. The device 805 may be an example of aspects of a base station 105 as described herein. The device 805 may include a receiver 810, a transmitter 815, and a communications manager 820. The device 805 may also include a processor (not shown). Each of these components may be in communication with one another (e.g., via one or more buses).

The receiver 810 may provide a means for receiving information such as packets, user data, control information, or any combination thereof associated with various information channels (e.g., control channels, data channels, information channels related to PTRS configurations for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PTRS configurations for sidelink communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of PTRS configurations for sidelink communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a network entity (e.g., the device 805) in accordance with examples as disclosed herein. For example, the communications manager 820 may be configured as or otherwise support a means for outputting a signaling indicating a PTRS configuration for sidelink communications, where the indicated PTRS configuration corresponds to a sidelink resource pool associated with a set of multiple UE. The communications manager 820 may be configured as or otherwise support a means for obtaining control signaling indicating to change the indicated PTRS configuration to a preferred PTRS configuration for the sidelink communications. The communications manager 820 may be configured as or otherwise support a means for updating the indicated PTRS configuration based at least in part on the obtained control signaling indicating to change the indicated PTRS configuration to the preferred PTRS configuration.

By including or configuring the communications manager 820 in accordance with examples as described herein, the device 805 (e.g., a processor controlling or otherwise coupled to the receiver 810, the transmitter 815, the communications manager 820, or any combination thereof) may support techniques for reduced power consumption.

Figure 9:
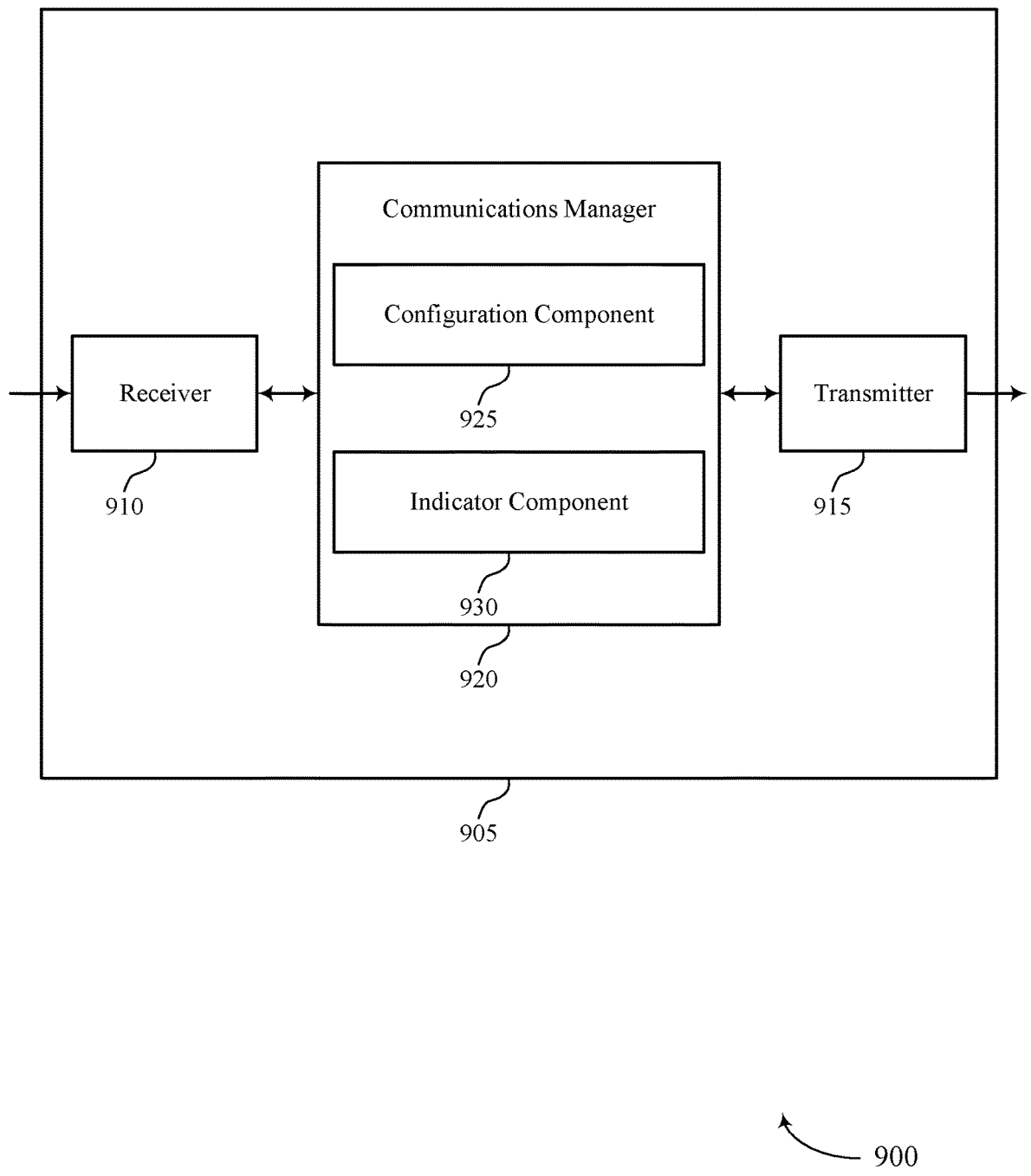

FIG. 9 shows a block diagram 900 of a device 905 that supports PTRS configurations for sidelink communications in accordance with aspects of the present disclosure. The device 905 may be an example of aspects of a device 805 or a base station 105 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for receiving information such as packets, user data, control information, or any combination thereof associated with various information channels (e.g., control channels, data channels, information channels related to PTRS configurations for sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to PTRS configurations for sidelink communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of PTRS configurations for sidelink communications as described herein. For example, the communications manager 920 may include a configuration component 925 an indicator component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network entity (e.g., the device 905) in accordance with examples as disclosed herein. The configuration component 925 may be configured as or otherwise support a means for outputting a signaling indicating a PTRS configuration for sidelink communications, where the indicated PTRS configuration corresponds to a sidelink resource pool associated with a set of multiple UE. The indicator component 930 may be configured as or otherwise support a means for obtaining control signaling indicating to change the indicated PTRS configuration to a preferred PTRS configuration for the sidelink communications. The configuration component 925 may be configured as or otherwise support a means for updating the indicated PTRS configuration based at least in part on the obtained control signaling indicating to change the indicated PTRS configuration to the preferred PTRS configuration.

Figure 10:
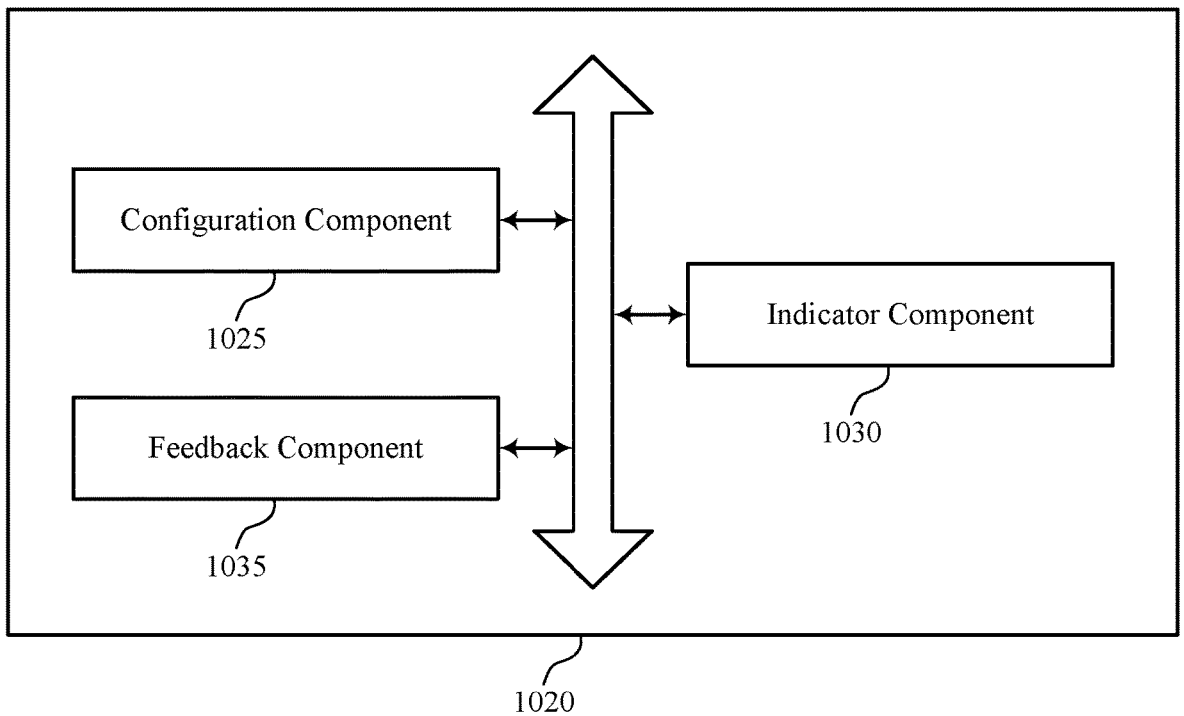
FIG. 10 shows a block diagram of a communications manager that supports PTRS configurations for sidelink communications in accordance with aspects of the present disclosure.

FIG. 10 shows a block diagram 1000 of a communications manager 1020 that supports PTRS configurations for sidelink communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of PTRS configurations for sidelink communications as described herein. For example, the communications manager 1020 may include a configuration component 1025, an indicator component 1030, a feedback component 1035, or any combination thereof. Each of these components may communicate, directly or indirectly, with one another (e.g., via one or more buses).

The communications manager 1020 may support wireless communication at a network entity in accordance with examples as disclosed herein. The configuration component 1025 may be configured as or otherwise support a means for outputting a signaling indicating a PTRS configuration for sidelink communications, where the indicated PTRS configuration corresponds to a sidelink resource pool associated with a set of multiple UE. The indicator component 1030 may be configured as or otherwise support a means for obtaining control signaling indicating to change the indicated PTRS configuration to a preferred PTRS configuration for the sidelink communications. In some examples, the configuration component 1025 may be configured as or otherwise support a means for updating the indicated PTRS configuration based at least in part on the obtained control signaling indicating to change the indicated PTRS configuration to the preferred PTRS configuration.

In some examples, to support updating the PTRS configuration, the configuration component 1025 may be configured as or otherwise support a means for updating the indicated PTRS configuration corresponding to the sidelink resource pool, updating a PTRS configuration corresponding to a sidelink link, or updating both, based at least in part on the obtained control signaling. In some examples, the preferred PTRS configuration corresponds to a sidelink link between a UE and at least one of the set of multiple UEs. In some examples, to support obtaining the control signaling, the feedback component 1035 may be configured as or otherwise support a means for obtaining a request message to change the indicated PTRS configuration to the preferred PTRS configuration for the sidelink communications.

In some examples, the configuration component 1025 may be configured as or otherwise support a means for determining a difference between the indicated PTRS configuration and the preferred PTRS configuration. In some examples, the configuration component 1025 may be configured as or otherwise support a means for where the difference corresponds to MCSs, resource blocks, or both, associated with the indicated PTRS configuration and the preferred PTRS configuration. In some examples, the control signaling includes an indication identifying the difference between the indicated PTRS configuration and the preferred PTRS configuration. In some examples, the feedback component 1035 may be configured as or otherwise support a means for outputting a feedback message associated with the preferred PTRS configuration, the feedback message including an ACK or a NACK. In some examples, the indicator component 1030 may be configured as or otherwise support a means for receiving second control signaling indicating an updated preferred PTRS configuration.

Figure 11:
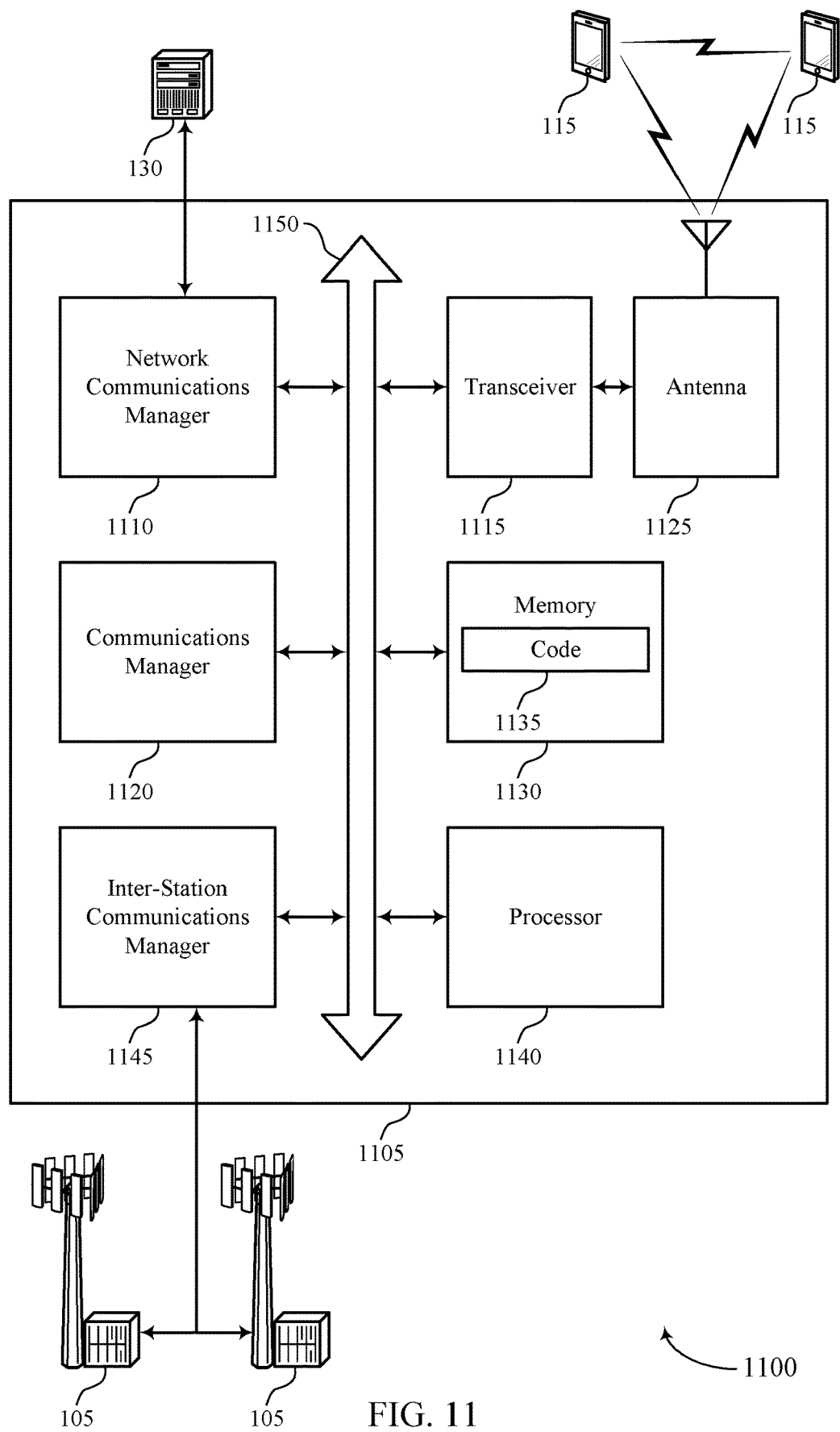
FIG. 11 shows a diagram of a system including a device that supports PTRS configurations for sidelink communications in accordance with aspects of the present disclosure.

FIG. 11 shows a diagram of a system 1100 including a device 1105 that supports PTRS configurations for sidelink communications in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting PTRS configurations for sidelink communications). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a network entity (e.g., the device 1105) in accordance with examples as disclosed herein. For example, the communications manager 1120 may be configured as or otherwise support a means for outputting a signaling indicating a PTRS configuration for sidelink communications, where the indicated PTRS configuration corresponds to a sidelink resource pool associated with a set of multiple UE. The communications manager 1120 may be configured as or otherwise support a means for obtaining control signaling indicating to change the indicated PTRS configuration to a preferred PTRS configuration for the sidelink communications. The communications manager 1120 may be configured as or otherwise support a means for updating the indicated PTRS configuration based at least in part on the obtained control signaling indicating to change the indicated PTRS configuration to the preferred PTRS configuration.

By including or configuring the communications manager 1120 in accordance with examples as described herein, the device 1105 may support techniques for improved communication reliability and reduced communication latency. Additionally, by including or configuring the communications manager 1120 in accordance with examples as described herein, the device 1105 may support techniques for reduced power consumption.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of PTRS configurations for sidelink communications as described herein, or the processor 1140 and the memory 1130 may be otherwise configured to perform or support such operations.

Figure 12:
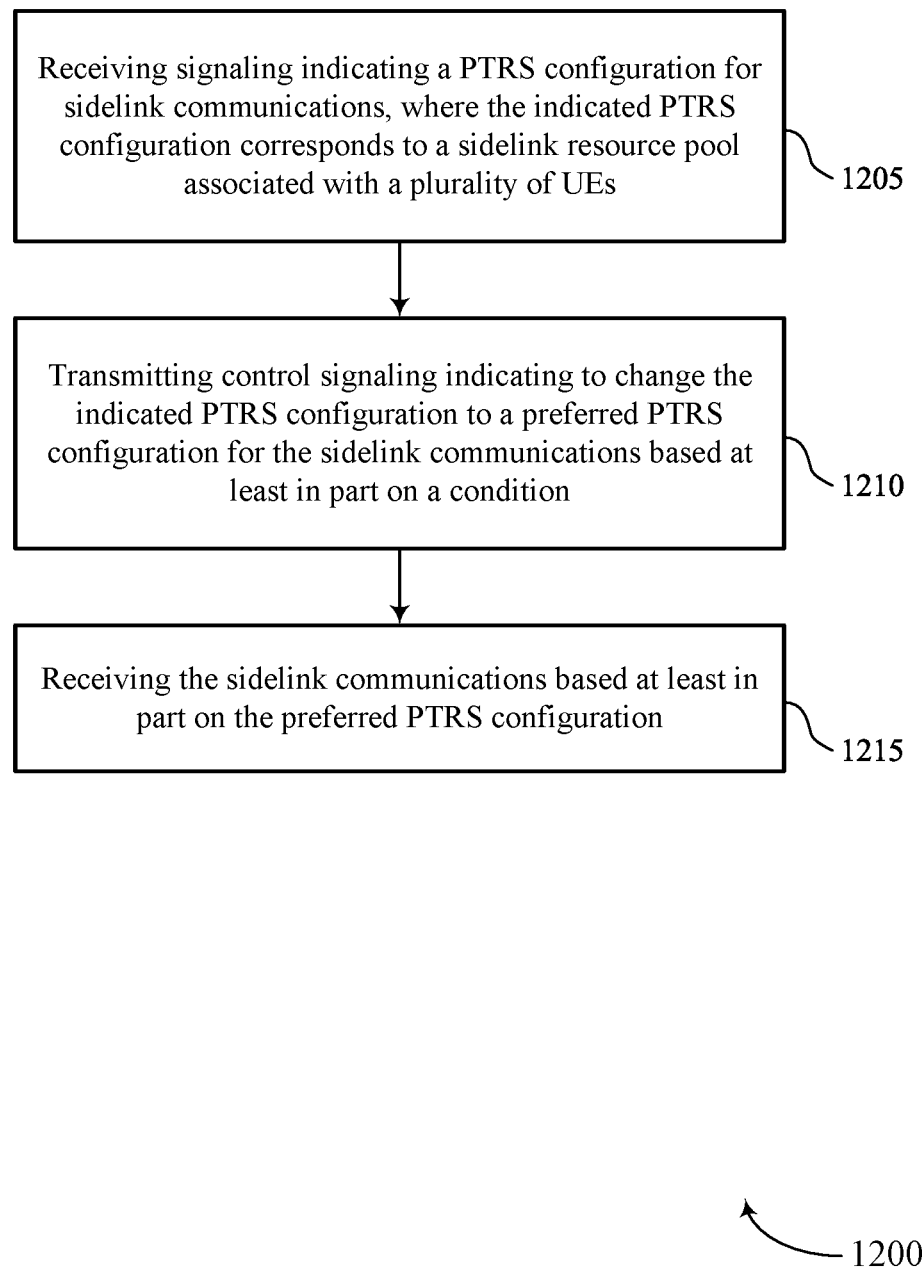
FIGS. 12 through 14 show flowcharts illustrating methods that support PTRS configurations for sidelink communications in accordance with aspects of the present disclosure.

FIG. 12 shows a flowchart illustrating a method 1200 that supports PTRS configurations for sidelink communications in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, a UE may perform aspects of the described functions using special-purpose hardware.

At 1205, the method may include receiving signaling indicating a PTRS configuration for sidelink communications, where the indicated PTRS configuration corresponds to a sidelink resource pool associated with a set of multiple UEs. The operations of 1205 may be performed in accordance with examples as disclosed herein. In some examples, aspects of the operations of 1205 may be performed by a configuration component 625 as described with reference to FIG. 6.

At 1210, the method may include transmitting control signaling indicating to change the indicated PTRS configuration to a preferred PTRS configuration for the sidelink communications based at least in part on a condition. The operations of 1210 may be performed in accordance with examples as disclosed herein. In some examples, aspects of the operations of 1210 may be performed by an indicator component 630 as described with reference to FIG. 6.

At 1215, the method may include receiving the sidelink communications based at least in part on the preferred PTRS configuration. The operations of 1215 may be performed in accordance with examples as disclosed herein. In some examples, aspects of the operations of 1215 may be performed by a sidelink component 635 as described with reference to FIG. 6.

Figure 13:
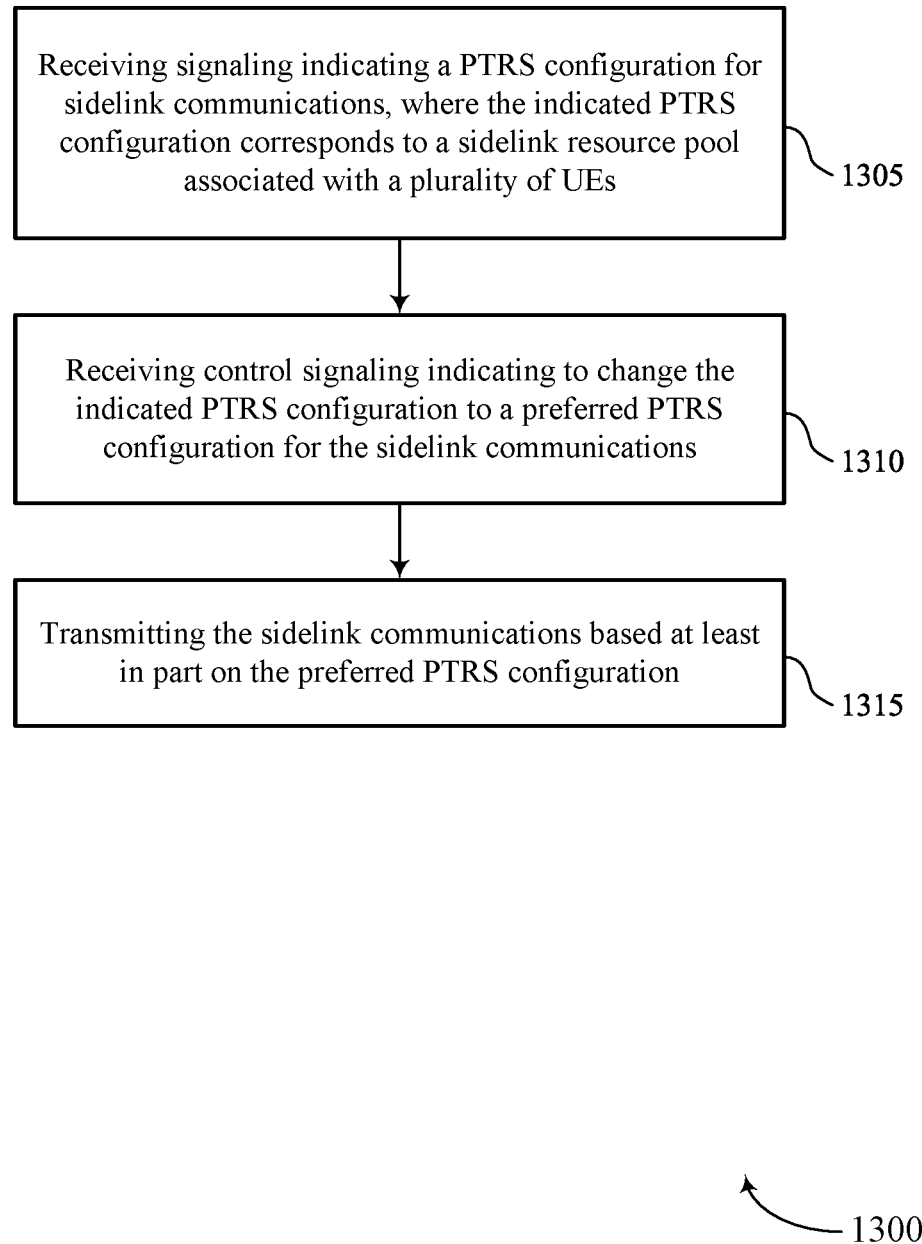

FIG. 13 shows a flowchart illustrating a method 1300 that supports PTRS configurations for sidelink communications in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, a UE may perform aspects of the described functions using special-purpose hardware.

At 1305, the method may include receiving signaling indicating a PTRS configuration for sidelink communications, where the indicated PTRS configuration corresponds to a sidelink resource pool associated with a set of multiple UEs. The operations of 1305 may be performed in accordance with examples as disclosed herein. In some examples, aspects of the operations of 1305 may be performed by a configuration component 625 as described with reference to FIG. 6.

At 1310, the method may include receiving control signaling indicating to change the indicated PTRS configuration to a preferred PTRS configuration for the sidelink communications. The operations of 1310 may be performed in accordance with examples as disclosed herein. In some examples, aspects of the operations of 1310 may be performed by an indicator component 630 as described with reference to FIG. 6.

At 1315, the method may include transmitting the sidelink communications based at least in part on the preferred PTRS configuration. The operations of 1315 may be performed in accordance with examples as disclosed herein. In some examples, aspects of the operations of 1315 may be performed by a sidelink component 635 as described with reference to FIG. 6.

Figure 14:
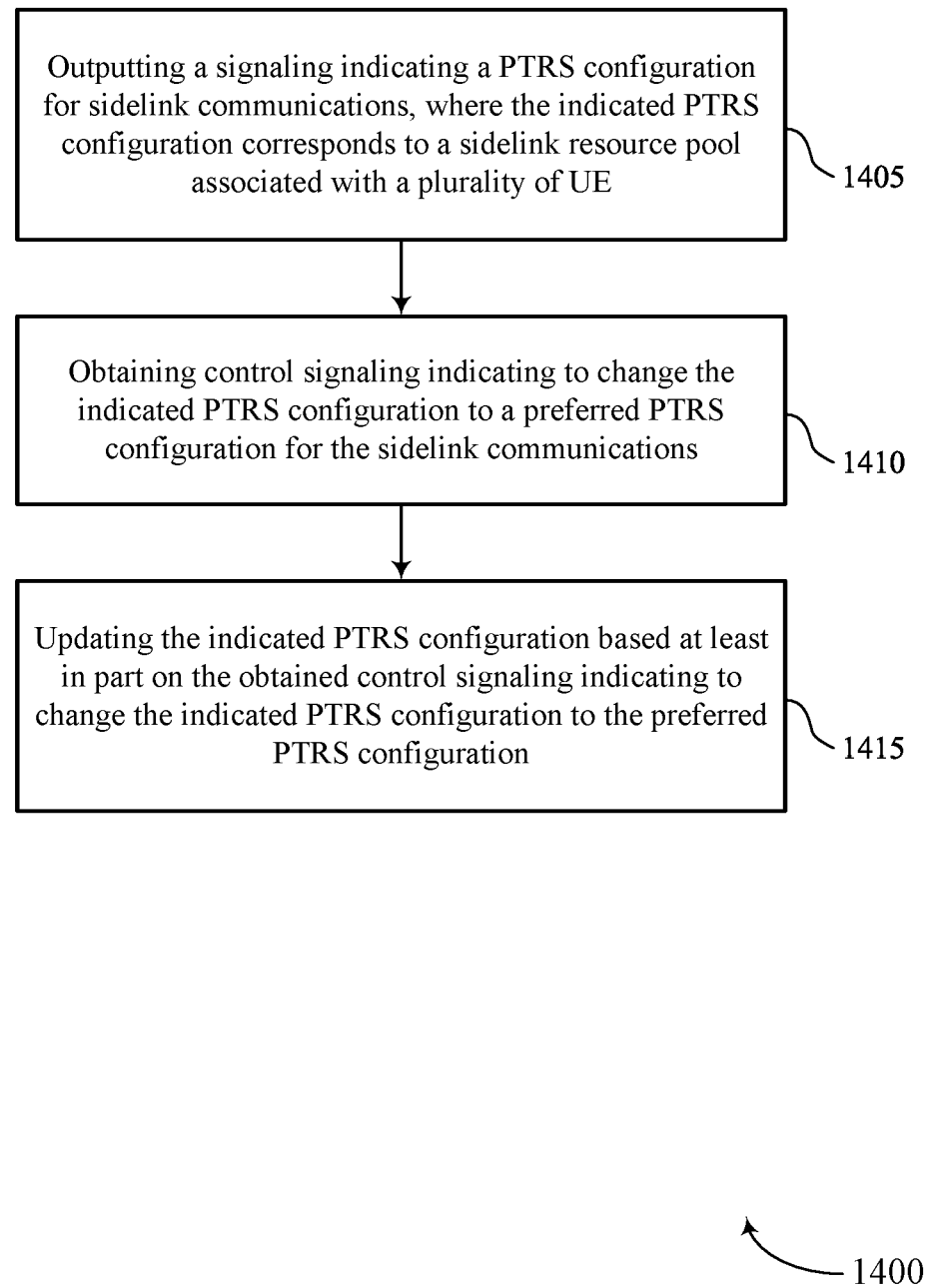

FIG. 14 shows a flowchart illustrating a method 1400 that supports PTRS configurations for sidelink communications in accordance with aspects of the present disclosure. The operations of the method 1400 may be implemented by a network entity or its components as described herein. For example, the operations of the method 1400 may be performed by a base station 105 as described with reference to FIGS. 1 through 3 and 8 through 11. In some examples, a network entity may execute a set of instructions to control the functional elements of the network entity to perform the described functions. Additionally or alternatively, a network entity may perform aspects of the described functions using special-purpose hardware.

At 1405, the method may include outputting a signaling indicating a PTRS configuration for sidelink communications, where the indicated PTRS configuration corresponds to a sidelink resource pool associated with a set of multiple UE. The operations of 1405 may be performed in accordance with examples as disclosed herein. In some examples, aspects of the operations of 1405 may be performed by a configuration component 1025 as described with reference to FIG. 10.

At 1410, the method may include obtaining control signaling indicating to change the indicated PTRS configuration to a preferred PTRS configuration for the sidelink communications. The operations of 1410 may be performed in accordance with examples as disclosed herein. In some examples, aspects of the operations of 1410 may be performed by an indicator component 1030 as described with reference to FIG. 10.

At 1415, the method may include updating the indicated PTRS configuration based at least in part on the obtained control signaling indicating to change the indicated PTRS configuration to the preferred PTRS configuration. The operations of 1415 may be performed in accordance with examples as disclosed herein. In some examples, aspects of the operations of 1415 may be performed by a configuration component 1025 as described with reference to FIG. 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving signaling indicating a PTRS configuration for sidelink communications, wherein the indicated PTRS configuration corresponds to a sidelink resource pool associated with a plurality of UEs; transmitting control signaling indicating to change the indicated PTRS configuration to a preferred PTRS configuration for the sidelink communications based at least in part on a condition; and receiving the sidelink communications based at least in part on the preferred PTRS configuration.

Aspect 2: The method of aspect 1, wherein the preferred PTRS configuration corresponds to a sidelink link between the UE and at least one UE of the plurality of UEs.

Aspect 3: The method of aspect 2, wherein the sidelink link comprises a bi-directional link, and the preferred PTRS configuration corresponds to at least one directional sidelink link of the bi-directional link.

Aspect 4: The method of any of aspects 1 through 3, wherein transmitting the control signaling comprises: transmitting a request message to change the indicated PTRS configuration to the preferred PTRS configuration for the sidelink communications.

Aspect 5: The method of any of aspects 1 through 4, further comprising: determining a difference between the indicated PTRS configuration and the preferred PTRS configuration, wherein the difference corresponds to modulation and coding schemes, resource blocks, or both, associated with the indicated PTRS configuration and the preferred PTRS configuration, and wherein the control signaling comprises an indication identifying the difference between the indicated PTRS configuration and the preferred PTRS configuration.

Aspect 6: The method of any of aspects 1 through 5, further comprising: receiving a feedback message associated with the preferred PTRS configuration, the feedback message comprising an ACK or a NACK, wherein receiving the sidelink communications is based at least in part on the received feedback message associated with the preferred PTRS configuration.

Aspect 7: The method of aspect 6, further comprising: receiving the sidelink communications, based at least in part on the indicated PTRS configuration, before a threshold time after receiving the ACK; or receiving the sidelink communications, based at least in part on the preferred PTRS configuration, at the threshold time, after the threshold time, or both, after receiving the ACK.

Aspect 8: The method of any of aspects 1 through 7, further comprising: refraining from transmitting the control signaling indicating to change the indicated PTRS configuration to the preferred PTRS configuration for the sidelink communications based at least in part on the condition.

Aspect 9: The method of any of aspects 1 through 8, further comprising: updating the preferred PTRS configuration based at least in part on the condition; and transmitting second control signaling indicating the updated preferred PTRS configuration.

Aspect 10: The method of any of aspects 1 through 9, wherein the condition corresponds to a PTRS density in a time domain, a frequency domain, or both.

Aspect 11: The method of any of aspects 1 through 10, wherein the condition corresponds to a likelihood for a decoding failure of the sidelink communications.

Aspect 12: A method for wireless communication at a UE, comprising: receiving signaling indicating a PTRS configuration for sidelink communications, wherein the indicated PTRS configuration corresponds to a sidelink resource pool associated with a plurality of UEs; receiving control signaling indicating to change the indicated PTRS configuration to a preferred PTRS configuration for the sidelink communications; and transmitting the sidelink communications based at least in part on the preferred PTRS configuration.

Aspect 13: The method of aspect 12, wherein the preferred PTRS configuration corresponds to a sidelink link between the UE and at least one UE of the plurality of UEs.

Aspect 14: The method of aspect 13, wherein the sidelink link comprises a bi-directional link, and the preferred PTRS configuration corresponds to at least one directional sidelink link of the bi-directional link.

Aspect 15: The method of any of aspects 12 through 14, wherein receiving the control signaling comprises: receiving a request message to change the indicated PTRS configuration to the preferred PTRS configuration for the sidelink communications.

Aspect 16: The method of any of aspects 12 through 15, further comprising: determining a difference between the indicated PTRS configuration and the preferred PTRS configuration, wherein the difference corresponds to modulation and coding schemes, resource blocks, or both, associated with the indicated PTRS configuration and the preferred PTRS configuration, and wherein the control signaling comprises an indication identifying the difference between the indicated PTRS configuration and the preferred PTRS configuration.

Aspect 17: The method of any of aspects 12 through 16, further comprising: transmitting a feedback message associated with the preferred PTRS configuration, the feedback message comprising an ACK or a NACK, wherein transmitting the sidelink communications is based at least in part on the transmitted feedback message associated with the preferred PTRS configuration.

Aspect 18: The method of aspect 17, further comprising: transmitting the sidelink communications, based at least in part on the indicated PTRS configuration, before a threshold time after transmitting the ACK; or transmitting the sidelink communications, based at least in part on the preferred PTRS configuration, at the threshold time, after the threshold time, or both, after transmitting the ACK.

Aspect 19: The method of any of aspects 12 through 18, further comprising: receiving second control signaling indicating an updated preferred PTRS configuration.

Aspect 20: A method for wireless communication at a network entity, comprising: outputting a signaling indicating a PTRS configuration for sidelink communications, wherein the indicated PTRS configuration corresponds to a sidelink resource pool associated with a plurality of UEs; obtaining control signaling indicating to change the indicated PTRS configuration to a preferred PTRS configuration for the sidelink communications; and updating the indicated PTRS configuration based at least in part on the obtained control signaling indicating to change the indicated PTRS configuration to the preferred PTRS configuration.

Aspect 21: The method of aspect 20, wherein updating the indicated PTRS configuration comprises: updating the indicated PTRS configuration corresponding to the sidelink resource pool, updating a PTRS configuration corresponding to a sidelink link, or updating both, based at least in part on the obtained control signaling.

Aspect 22: The method of any of aspects 20 through 21, wherein the preferred PTRS configuration corresponds to a sidelink link between a UE and at least one of the plurality of UEs.

Aspect 23: The method of any of aspects 20 through 22, wherein obtaining the control signaling comprises: obtaining a request message to change the indicated PTRS configuration to the preferred PTRS configuration for the sidelink communications.

Aspect 24: The method of any of aspects 20 through 23, further comprising: determining a difference between the indicated PTRS configuration and the preferred PTRS configuration; wherein the difference corresponds to modulation and coding schemes, resource blocks, or both, associated with the indicated PTRS configuration and the preferred PTRS configuration, and wherein the control signaling comprises an indication identifying the difference between the indicated PTRS configuration and the preferred PTRS configuration.

Aspect 25: The method of any of aspects 20 through 24, further comprising: outputting a feedback message associated with the preferred PTRS configuration, the feedback message comprising an ACK or a NACK.

Aspect 26: The method of aspect 25, further comprising: receiving second control signaling indicating an updated preferred PTRS configuration.

Aspect 27: An apparatus for wireless communication at a UE, comprising a processor a memory coupled with the processor, with instructions stored in the memory, the instructions being executable by the processor to cause the apparatus to perform a method of any of aspects 1 through 11.

Aspect 28: An apparatus for wireless communication at a UE, comprising at least one means for performing a method of any of aspects 1 through 11.

Aspect 29: A non-transitory computer-readable medium storing code for wireless communication at a UE, the code comprising instructions executable by a processor to perform a method of any of aspects 1 through 11.

Aspect 30: An apparatus for wireless communication at a UE, comprising a processor; a memory coupled with the processor, with instructions stored in the memory, the instructions being executable by the processor to cause the apparatus to perform a method of any of aspects 12 through 19.

Aspect 31: An apparatus for wireless communication at a UE, comprising at least one means for performing a method of any of aspects 12 through 19.

Aspect 32: A non-transitory computer-readable medium storing code for wireless communication at a UE, the code comprising instructions executable by a processor to perform a method of any of aspects 12 through 19.

Aspect 33: An apparatus for wireless communication at a network entity, comprising a processor; memory coupled with the processor; and instructions stored in the memory and executable by the processor to cause the apparatus to perform a method of any of aspects 20 through 26.

Aspect 34: An apparatus for wireless communication at a network entity, comprising at least one means for performing a method of any of aspects 20 through 26.

Aspect 35: A non-transitory computer-readable medium storing code for wireless communication at a network entity, the code comprising instructions executable by a processor to perform a method of any of aspects 20 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as any combination of computing devices (e.g., any combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving signaling indicating a phase tracking reference signal configuration for sidelink communications, wherein the indicated phase tracking reference signal configuration corresponds to a sidelink resource pool associated with a plurality of UEs;
   transmitting control signaling indicating to change the indicated phase tracking reference signal configuration to a preferred phase tracking reference signal configuration for the sidelink communications based at least in part on a condition; and
   receiving the sidelink communications based at least in part on the preferred phase tracking reference signal configuration.

2. The method of claim 1, wherein the preferred phase tracking reference signal configuration corresponds to a sidelink link between the UE and at least one UE of the plurality of UEs.

3. The method of claim 2, wherein the sidelink link comprises a bi-directional link, and the preferred phase tracking reference signal configuration corresponds to at least one directional sidelink link of the bi-directional link.

4. The method of claim 1, wherein transmitting the control signaling comprises:
   transmitting a request message to change the indicated phase tracking reference signal configuration to the preferred phase tracking reference signal configuration for the sidelink communications.

5. The method of claim 1, further comprising:
determining a difference between the indicated phase tracking reference signal configuration and the preferred phase tracking reference signal configuration,
wherein the difference corresponds to modulation and coding schemes, resource blocks, or both, associated with the indicated phase tracking reference signal configuration and the preferred phase tracking reference signal configuration, and
wherein the control signaling comprises an indication identifying the difference between the indicated phase tracking reference signal configuration and the preferred phase tracking reference signal configuration.

6. The method of claim 1, further comprising:
receiving a feedback message associated with the preferred phase tracking reference signal configuration, the feedback message comprising an acknowledgment or a negative acknowledgement,
wherein receiving the sidelink communications is based at least in part on the received feedback message associated with the preferred phase tracking reference signal configuration.

7. The method of claim 6, further comprising:
receiving the sidelink communications, based at least in part on the indicated phase tracking reference signal configuration, before a threshold time after receiving the acknowledgment; or
receiving the sidelink communications, based at least in part on the preferred phase tracking reference signal configuration, at the threshold time, after the threshold time, or both, after receiving the acknowledgment.

8. The method of claim 1, further comprising:
refraining from transmitting the control signaling indicating to change the indicated phase tracking reference signal configuration to the preferred phase tracking reference signal configuration for the sidelink communications based at least in part on the condition.

9. The method of claim 1, further comprising:
updating the preferred phase tracking reference signal configuration based at least in part on the condition; and
transmitting second control signaling indicating the updated preferred phase tracking reference signal configuration.

10. The method of claim 1, wherein the condition corresponds to a phase tracking reference signal density in a time domain, a frequency domain, or both.

11. The method of claim 1, wherein the condition corresponds to a likelihood for a decoding failure of the sidelink communications.

12. A method for wireless communication at a user equipment (UE), comprising:
receiving signaling indicating a phase tracking reference signal configuration for sidelink communications, wherein the indicated phase tracking reference signal configuration corresponds to a sidelink resource pool associated with a plurality of UEs;
receiving control signaling indicating to change the indicated phase tracking reference signal configuration to a preferred phase tracking reference signal configuration for the sidelink communications; and
transmitting the sidelink communications based at least in part on the preferred phase tracking reference signal configuration.

13. The method of claim 12, wherein the preferred phase tracking reference signal configuration corresponds to a sidelink link between the UE and at least one UE of the plurality of UEs.

14. The method of claim 13, wherein the sidelink link comprises a bi-directional link, and the preferred phase tracking reference signal configuration corresponds to at least one directional sidelink link of the bi-directional link.

15. The method of claim 12, wherein receiving the control signaling comprises:
receiving a request message to change the indicated phase tracking reference signal configuration to the preferred phase tracking reference signal configuration for the sidelink communications.

16. The method of claim 12, further comprising:
determining a difference between the indicated phase tracking reference signal configuration and the preferred phase tracking reference signal configuration,
wherein the difference corresponds to modulation and coding schemes, resource blocks, or both, associated with the indicated phase tracking reference signal configuration and the preferred phase tracking reference signal configuration, and
wherein the control signaling comprises an indication identifying the difference between the indicated phase tracking reference signal configuration and the preferred phase tracking reference signal configuration.

17. The method of claim 12, further comprising:
transmitting a feedback message associated with the preferred phase tracking reference signal configuration, the feedback message comprising an acknowledgment or a negative acknowledgement,
wherein transmitting the sidelink communications is based at least in part on the transmitted feedback message associated with the preferred phase tracking reference signal configuration.

18. The method of claim 17, further comprising:
transmitting the sidelink communications, based at least in part on the indicated phase tracking reference signal configuration, before a threshold time after transmitting the acknowledgment; or
transmitting the sidelink communications, based at least in part on the preferred phase tracking reference signal configuration, at the threshold time, after the threshold time, or both, after transmitting the acknowledgment.

19. The method of claim 12, further comprising:
receiving second control signaling indicating an updated preferred phase tracking reference signal configuration.

20. A method for wireless communication at a network entity, comprising:
outputting a signaling indicating a phase tracking reference signal configuration for sidelink communications, wherein the indicated phase tracking reference signal configuration corresponds to a sidelink resource pool associated with a plurality of user equipments (UEs);
obtaining control signaling indicating to change the indicated phase tracking reference signal configuration to a preferred phase tracking reference signal configuration for the sidelink communications; and
updating the indicated phase tracking reference signal configuration based at least in part on the obtained control signaling indicating to change the indicated phase tracking reference signal configuration to the preferred phase tracking reference signal configuration.

21. The method of claim 20, wherein updating the indicated phase tracking reference signal configuration comprises:

updating the indicated phase tracking reference signal configuration corresponding to the sidelink resource pool, updating a phase tracking reference signal configuration corresponding to a sidelink link, or updating both, based at least in part on the obtained control signaling.

22. The method of claim 20, wherein the preferred phase tracking reference signal configuration corresponds to a sidelink link between a UE and at least one of the plurality of UEs.

23. The method of claim 20, wherein obtaining the control signaling comprises:
obtaining a request message to change the indicated phase tracking reference signal configuration to the preferred phase tracking reference signal configuration for the sidelink communications.

24. The method of claim 20, further comprising:
determining a difference between the indicated phase tracking reference signal configuration and the preferred phase tracking reference signal configuration,
wherein the difference corresponds to modulation and coding schemes, resource blocks, or both, associated with the indicated phase tracking reference signal configuration and the preferred phase tracking reference signal configuration, and
wherein the control signaling comprises an indication identifying the difference between the indicated phase tracking reference signal configuration and the preferred phase tracking reference signal configuration.

25. The method of claim 20, further comprising:
outputting a feedback message associated with the preferred phase tracking reference signal configuration, the feedback message comprising an acknowledgment or a negative acknowledgement.

26. The method of claim 25, further comprising:
receiving second control signaling indicating an updated preferred phase tracking reference signal configuration.

27. An apparatus for wireless communication at a user equipment (UE), comprising:
a processor; and
a memory coupled with the processor, with instructions stored in the memory, the instructions being executable by the processor to cause the apparatus to:
receive signaling indicating a phase tracking reference signal configuration for sidelink communications, wherein the indicated phase tracking reference signal configuration corresponds to a sidelink resource pool associated with a plurality of UEs;
transmit control signaling indicating to change the indicated phase tracking reference signal configuration to a preferred phase tracking reference signal configuration for the sidelink communications based at least in part on a condition; and
receive the sidelink communications based at least in part on the preferred phase tracking reference signal configuration.

28. The apparatus of claim 27, wherein the preferred phase tracking reference signal configuration corresponds to a sidelink link between the UE and at least one UE of the plurality of UEs.

29. The apparatus of claim 28, wherein the sidelink link comprises a bi-directional link, and the preferred phase tracking reference signal configuration corresponds to at least one directional sidelink link of the bi-directional link.

30. The apparatus of claim 27, wherein the instructions to transmit the control signaling are executable by the processor to cause the apparatus to:
transmit a request message to change the indicated phase tracking reference signal configuration to the preferred phase tracking reference signal configuration for the sidelink communications.

* * * * *